US006983263B1

(12) United States Patent
Demko et al.

(10) Patent No.: US 6,983,263 B1
(45) Date of Patent: Jan. 3, 2006

(54) ELECTRONIC BOARDROOM

(75) Inventors: Lisa A. Demko, Stamford, CT (US); Denis J. Nayden, Wilton, CT (US); William H. Cary, Darien, CT (US); James A. Colica, Greenwich, CT (US); Frank S. Brokaw, Greenwich, CT (US); Gareth J. Davies, Redding, CT (US); Christopher P. Perreta, New York, NY (US)

(73) Assignee: General Electric Capital Corporation, Stamford, CT (US)

( * ) Notice: Subject to any disclaimer, the term of this patent is extended or adjusted under 35 U.S.C. 154(b) by 637 days.

(21) Appl. No.: 09/710,056

(22) Filed: Nov. 10, 2000

(51) Int. Cl.
*G06F 17/60* (2006.01)

(52) U.S. Cl. .................... 705/80; 705/1; 705/7; 705/8; 705/9; 705/10; 717/100; 703/6; 703/13

(58) Field of Classification Search .................... 705/1, 705/80, 7–10; 717/100; 703/6, 13
See application file for complete search history.

(56) References Cited

U.S. PATENT DOCUMENTS 5,924,072 A 7/1999 Havens
5,937,406 A 8/1999 Balabine et al.
5,963,931 A 10/1999 Fagg, III et al.
5,978,784 A 11/1999 Fagg, III et al.
6,141,653 A * 10/2000 Conklin et al. ............... 705/80
6,161,101 A * 12/2000 Guinta et al. ................. 706/45
6,209,095 B1 3/2001 Anderson et al.
6,219,654 B1 * 4/2001 Ruffin ........................ 705/400
6,249,769 B1 * 6/2001 Ruffin et al. .................. 705/7
6,292,827 B1 9/2001 Raz
6,347,303 B2 * 2/2002 Nagai et al. ................... 705/7
2002/0032592 A1 * 3/2002 Krasnick et al. ............... 705/8

* cited by examiner

*Primary Examiner*—James P. Trammell
*Assistant Examiner*—John Winter
(74) *Attorney, Agent, or Firm*—Armstrong Teasdale LLP

(57) ABSTRACT

Methods and systems for organization management using an electronic boardroom to facilitate review of business specific information in a uniform format are described. In one embodiment, the method comprises receiving and storing information relating to a business into databases accessible to authorized users and organizing the information which includes reviewer comments and approvals or disapproval. The information is then reported to a user for further actions. While described in terms of a business deal, the methods and systems described are applicable for other aspects of a business including financial, business development and compliance issues.

22 Claims, 22 Drawing Sheets

240

320

400

470

ELECTRONIC BOARDROOM

BACKGROUND OF THE INVENTION

This invention relates generally to management functions within an organization, and more specifically, to computer-based methods and systems for assisting organization management during, for example, business transactions.

In the traditional boardroom setting, a board of directors meet, typically monthly, quarterly or semi annually, to be updated on corporate progress, discuss management issues and to review any major business deals that may be in progress. A board of directors is typically composed of individuals who are geographically diverse, perhaps even international. Getting all members of the board together in one place therefore can be a formidable task, especially considering that a typical board member is usually employed in a top level position at another company or has other, similar constraints on his or her time.

In addition, information gathering for such a meeting is in and of itself a daunting task, especially for a large international corporation. Information from subsidiaries and components the world over has to be gathered and condensed into a format, typically paper handouts, where directors with multiple levels of understanding can digest and come to understand what is in the presentations or meeting agendas and make reasonable business decisions for the corporation. Directors are expected to make decisions on, for example, potential business deals, financial outlooks, quality initiatives, compliance, and business development.

Director review, in regard to potential business deals, is typically limited to those considered very significant to the organization or corporation. In preparing for such a review, a business normally creates a transaction review document ("deal package") that includes a pitch, cover memo and appropriate preliminary managerial approvals. After the transaction review document is assembled, it is circulated to the various directors for review and an ultimate acceptance or rejection at the board meeting. During this process, recommendations may be made by the directors. However, if the board is unable to meet, the deal is stalled until a board meeting can be held.

Known organizational management and decision making methods, as described above, have several disadvantages. For example, the methods are largely paper-based and very time consuming. It would be desirable to develop methods and systems that would allow a management function to receive and review the information needed to make important decisions regarding the business at anytime or anyplace without the expense and logistics of the known paper based systems or scheduled meeting methodology and travel constraints.

BRIEF SUMMARY OF THE INVENTION

In one aspect, the present invention is a system for organization management and configured as an electronic boardroom. In an exemplary embodiment, the system comprises at least one computer coupled to a server configured to receive and store information relating to a business within multiple databases. The server is further configured to organize the information within the databases and report the information to a user. The system also includes a network connecting the server to the computer and an interface that facilitates requester information input to the server and reception of information output from the server.

Using an electronic boardroom, a board of directors, for example, are able to conduct a meeting, real-time and on-line, when the board members are dispersed throughout the world. Agendas and audio transmission capabilities enhance communication during the on-line meetings. Alternatively, directors, for example, are able to "attend" an electronic boardroom meeting, when convenient, and are able to review other director comments, and enter comments of their own, for review by the other directors.

DETAILED DESCRIPTION OF THE INVENTION

Figure 1:
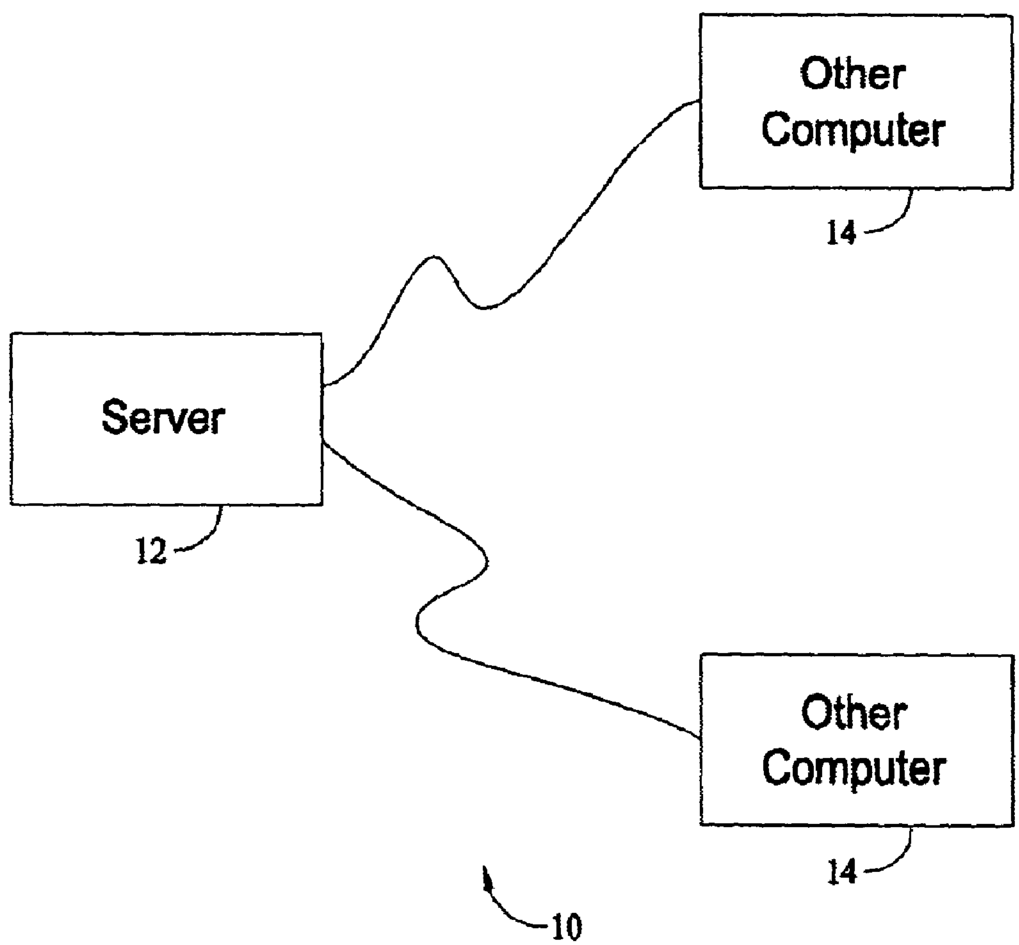
FIG. 1 is a system block diagram.

FIG. 1 illustrates an exemplary system 10 in accordance with one embodiment of the present invention. System 10 includes a computer configured as a server 12 and a plurality of other computers 14 coupled to server 12 to form a network. The network of computers may be a local area network (LAN) or a wide area network (WAN).

Server 12 is configured to receive and store information relating to business deals, financial statements, compliance issues and business development into one or more databases. One database included within server 12 is a boardroom database which acts as a shell for an electronic boardroom application and contains configuration documents, a home page, and links to other applications. The boardroom database serves to keep the boardroom application modular thereby allowing new applications to be plugged into the boardroom application.

Also stored within server 12 is a deals database. The deals database is a core application which contains deal documents, attachments and supporting materials and acts as a tracking application, providing a working area for draft documents and deals in the process of evaluation. Other databases within server 12 are business review databases which contain submitted business unit files, also known as dashboards, which are described in more detail below. A boardroom keyword database within server 12 contains keyword lookups including reviewers, maximum approvers, document resolution, types of funding and allows for changes in the applications within the boardroom without recoding. In addition, help and feedback databases are maintained, the feedback database being configured to store user comments and suggestions for improvements. Comments and suggestions are considered by administrators of system 10. All of the information within the databases above described is organized and the information within is available and capable of being reported to the user.

In one embodiment, server 12 is coupled to computers 14 via a WAN or LAN. In alternative embodiments, a user may dial or directly login to an Intranet or the Internet to gain access. Each computer 14 includes an interface for communicating with server 12. The interface facilitates user input of data relating to the business and also the reception of information output. A computer-based organization management tool, as described below in more detail and including the databases described above, is stored in server computer 12 and can be accessed by a requester at any one of computers 14 providing anytime, anyplace access to business information required by decision makers. System 10 reduces the need for multiple face-to-face meetings for, as an example, corporate directors who often have difficulty assembling face-to-face due to travel or other management commitments. When so configured, system 10 is an electronic boardroom which provides a management forum when rapidly developing management issues require rapid responses from a management team. Alternatively, when time is not critical, system 10 provides for business review in a paperless fashion, with alternative embodiments as described below. In one embodiment, the databases are accessible from an Intranet or Internet web page.

Figure 2:
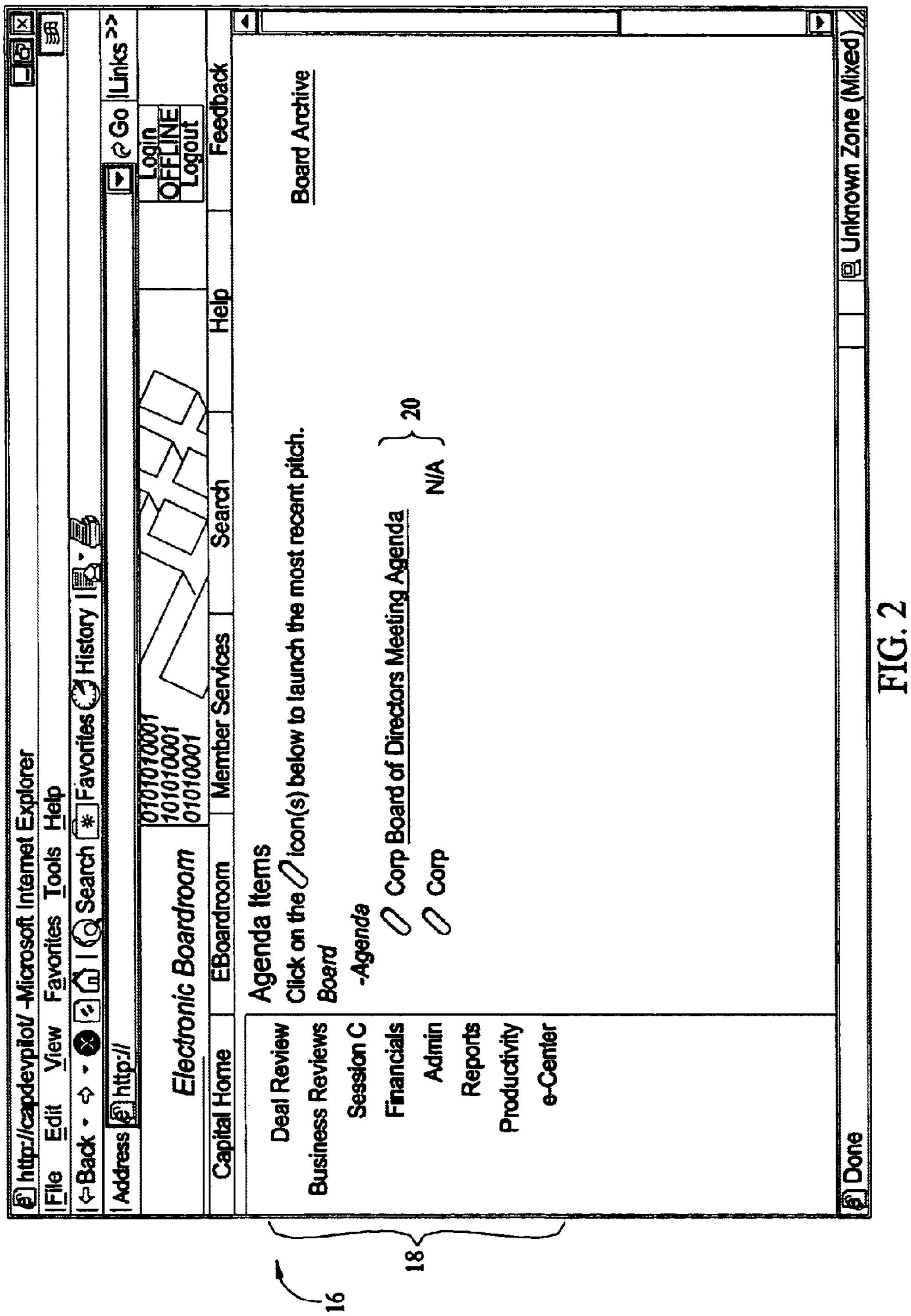
FIG. 2 is a web page which is configured as a home page for an electronic boardroom.

FIG. 2 shows an example of a web page 16 for accessing a shell application which includes the home page for the electronic boardroom. Web page 16 includes one or more links 18 where a user can access databases which include, for example, deals to be reviewed, business reviews, financials, report generation, employee performance reviews, productivity review and an e-Center. In alternative embodiments, web page 16 includes an administration and maintenance link if the user is in an administration role for the electronic boardroom. Also shown on web page 16 is an agenda including agenda items 20, where a user can access and view the most recently added items to the user's agenda. Security for the database is enforced by the roles assigned to each user and by document reader fields.

In one embodiment, system 10 (shown in FIG. 1) receives and stores an audio comment that is directed to at least one pre-defined recipient. The pre-defined recipient may be selected in accordance with a knowledge base that includes any information relevant to determining an appropriate recipient. In one specific embodiment, when an audio comment is received, it is deleted after it is reported to the recipient at least two times.

Figure 3:
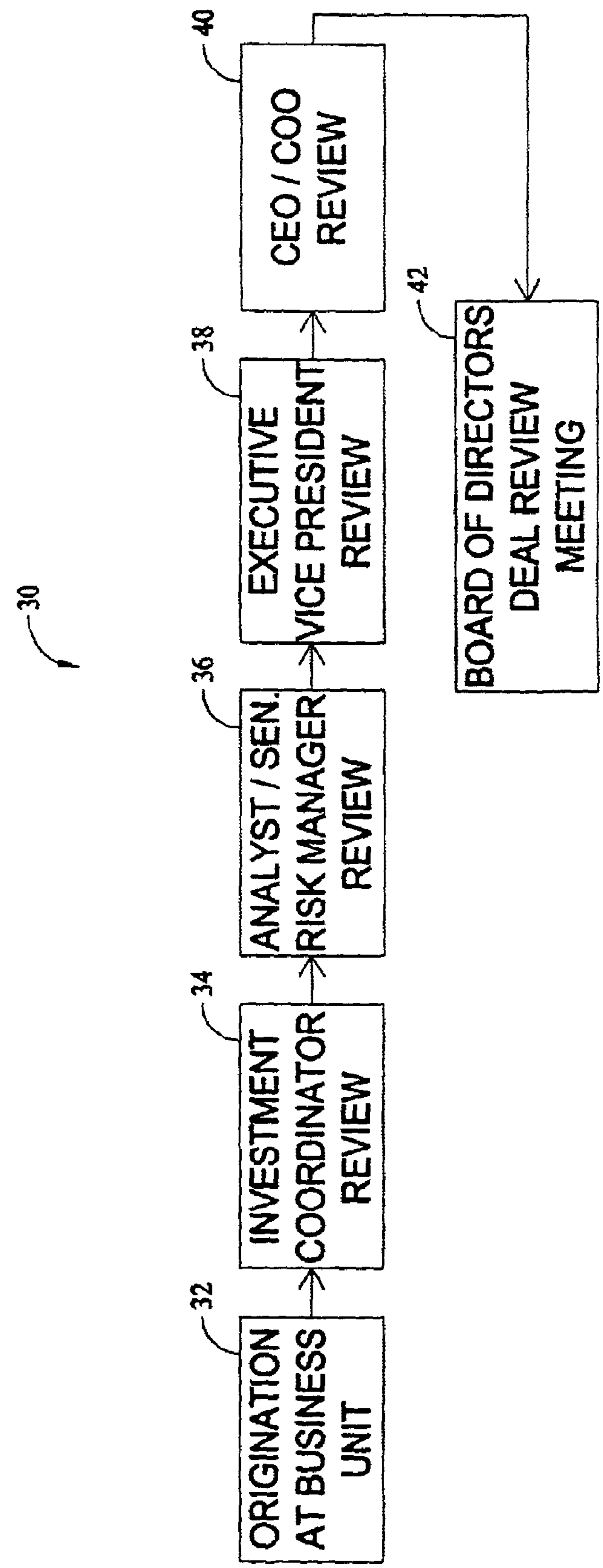
FIG. 3 is a flowchart showing approval levels.

FIG. 3 is a flowchart 30 showing approval levels for a deal. A deal is originated 32 at a business unit, where a user enters deal specifics into system 10 (shown in FIG. 1), including a maximum reviewer, who is selected based upon the size of the deal and approval levels appropriate with the deal. New deals entered into system 10 are reviewed 34 for completeness by an investment coordinator who enters a list of reviewers for each deal. Typical levels and reviews encountered during a deal approval process include review 36 an analyst/senior risk manager, review 38 by an executive vice-president, chief executive officer (CEO)/chief operating officer (COO) review 40, and finally review 42 at a deal review meeting (DRM) of the board of directors. As an example an executive vice-president may have approval authority for deals less than $100,000, therefore for deals that are less than $100,000, the executive vice-president is the maximum approver. Continuing with the example, for deals in excess of $10,000,000, board of director approval may be required, making the board of directors the maximum approver.

Figure 4:
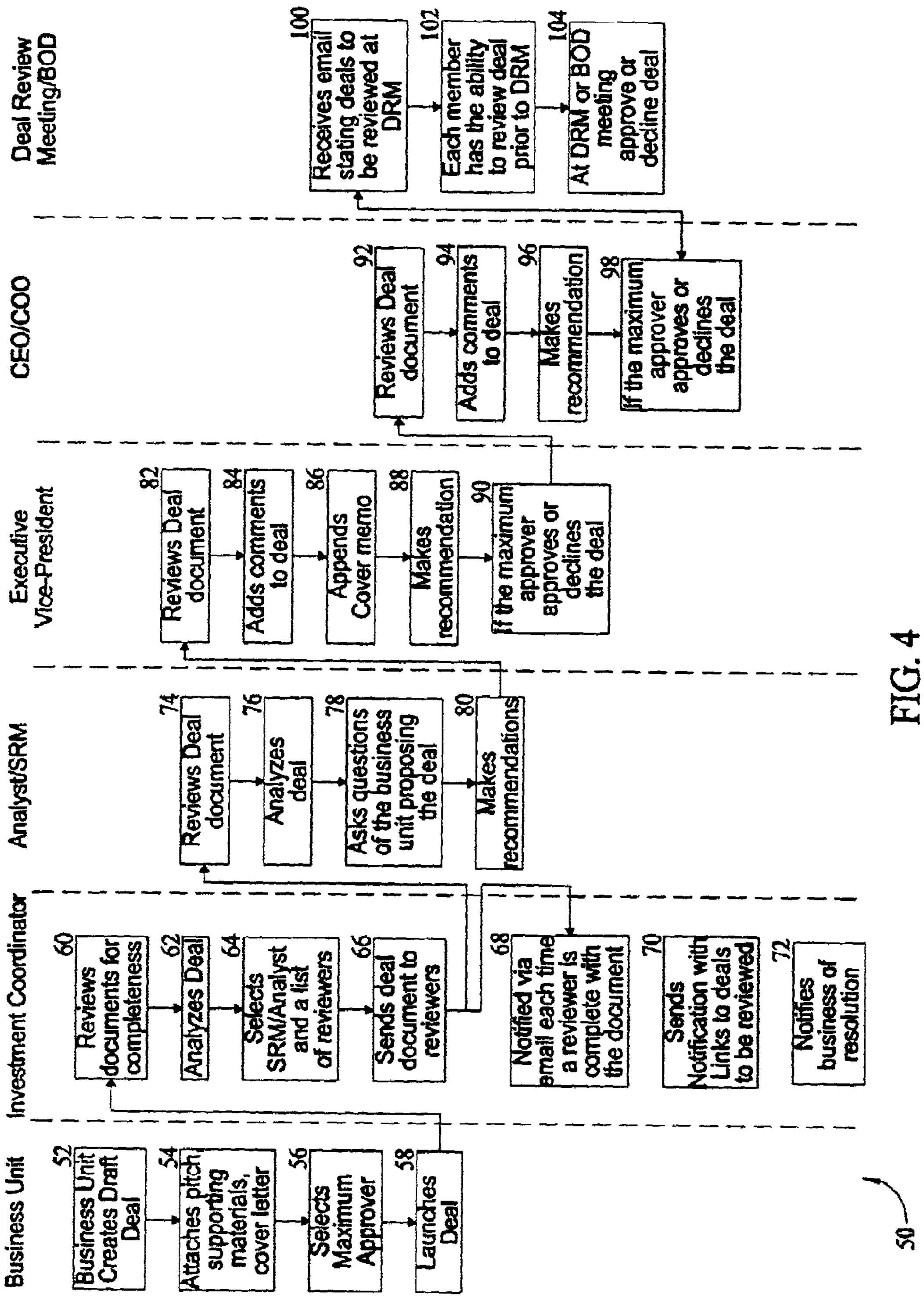
FIG. 4 is a flowchart diagramming process steps executed in an approval of a deal using an organization management system.

Referring to FIG. 4, a flowchart 50 is shown diagramming process steps executed in a multi-level approval of a deal using the approval structure described in FIG. 3. More specifically, a business unit creates 52 a proposed deal, and a pitch to go with the proposed deal. A representative of a business, for example a manager, uses system 10 to enter information regarding the pitch. The proposed deal, the pitch, supporting materials, and a cover letter are then attached 54. The deal, pitch, and supporting materials are typically electronic files or e-mail stored in any of a number of known formats. A maximum approver is then selected 56 according to approval limitations in place. In one embodiment, the maximum approver is selected 56 in accordance with a knowledge base. The knowledge base includes information relevant to the selection 56 of a maximum approver including information linking specific maximum approvers with specific types of transactions or specific business units. The proposed deal is launched 58 by sending the proposed deal to a investment coordinator. Once a deal is launched 58, changes cannot be made to the proposed deal without relaunching the revised proposed deal with a new pitch, forcing an individual who launches a deal to be efficient and to focus on the business in order to obtain eventual deal approval.

In one embodiment, deal launching is part of a business development process which uses a business development management system. The business development management system is linked to the electronic boardroom, and deals launched on the business development management system are automatically fed into the electronic boardroom deal review process, described below, using a scheduling mechanism within the electronic boardroom system. In addition, templates for business reviews, or dashboards, are automatically populated with the information received from the business development management system.

The investment coordinator is responsible for multiple activities which include receiving the deal from the business unit, updating a transaction log listing the deals, validation of the supporting materials describing the proposed deal, and finally passing the deal to a senior risk manager (SRM). Documents are initially reviewed 60 for completeness by the investment coordinator. In an alternative embodiment, system 10 (shown in FIG. 1) is configured to notify the investment coordinator of the arrival of a new proposed deal.

The investment coordinator analyzes 62 the deal. The investment coordinator then selects 64 an analyst/SRM from a list of SRMs assigned to business areas and further selects 64 the reviewers at all levels of the business organization based upon the type of deal proposed. System 10 is further configured to send 66 notification of the deal and the deal documentation to the analyst/SRM and the reviewers.

The investment coordinator is notified 68 by e-mail each time a reviewer has completed review of the proposed deal. A notification is sent 70 so the proposed deal is available for review at the next deal review meeting (DRM) including links to deals to be reviewed. Reviewers are kept appraised of the number of deals they are to review, the turn-around time required within each deal and agendas relating to the deals with in-boxes and action items as will be described in further detail below. System 10 is also configured to notify 72 the originating business unit of any resolutions concerning a particular proposed deal. As used herein, a resolution includes, but is not limited to an acceptance or a rejection of a deal.

The SRM has responsibility for a recommendation as to whether or not the proposed deal should be approved. In coming to such a conclusion, the SRM reviews 74 the deal documents, analyzes 76 the deal, makes contact with the business unit proposing the deal, poses 78 questions to the business unit regarding the deal, and makes 80 recommendations and determinations about where the deal needs to go next. The SRM can make recommendations to approve, approve with conditions, or decline a proposed deal. Should the SRM recommend to decline the deal, the business unit proposing the deal has an option to pass the deal to an executive vice-president for evaluation (not shown in FIG. 4). Management levels above the analyst/SRM either decline or approve a deal if they are the maximum approver or they may make recommendations as the deal is sent up to the next management level if they are not the maximum approver.

After recommendations are made 80 by the analyst/SRM, the deal documents are reviewed 82 by the next higher authority level (a vice-presidential level is shown in FIG. 4). In an alternative embodiment, while a recommendation is being made, or a deal is being reviewed, other reviewers are reviewing in parallel or simultaneously. The reviewer adds 84 comments to the deal, appends 86 the cover memo and makes 88 recommendations, if necessary. If this level of authority is the maximum approver for the deal being reviewed, the deal may be approved or declined 90. If not the maximum approver of the deal, the deal is forwarded on to be reviewed 92 by a next level of authority (a CEO/COO level is shown in FIG. 4), and the process is repeated.

The deal documents are reviewed 92 at the executive level and comments are added 94 to the deal, and recommendations are made 96 by reviewers at the executive level. If this level of authority is the maximum approver for the deal, the maximum approver approves or declines 98 the deal. If not the maximum approver of the deal, the deal is forwarded on to be reviewed at the highest level of authority, for example, a board of directors. In one embodiment, the directors each receive 100 an e-mail, automatically sent by system 10, identifying deals to be reviewed, for example, at a deal review meeting (DRM) conducted using system 10, which in one embodiment, precedes the board of directors meeting. Each board member has the ability to review 102 the deal at anytime and from anyplace before the DRM. After the deal is approved or declined 104 at the director meeting, notifications are made.

In yet another alternative embodiment, after a deal is approved, rejected or withdrawn, all comments relating to that deal are automatically destroyed or deleted by system 10.

An electronic boardroom system is configurable for other functionality over and above deal reviewing and processing. In addition to the deal document databases, business reviews (i.e. dashboards), document templates, reports, boardroom calendar information, and capabilities for real time collaborations are provided. The deal databases described above are configured for storage of certain relevant information. To ensure the proper information is entered by a system user, templates guide users when entering data. The templates have required entry fields which ensure the receipt of complete deal packages at the first review. Another advantage to the templates is the standardization of captured information. Complete information packages and standardized formatting save time and effort. The databases provide a central repository of deal information such as the pitch to be given or previously given, revisions to the deal, cover memos and other files. The information retained within the deal database provides a mechanism for tracking deals throughout the approval process.

Business reviews are databases which are automatically populated using a form according to the business unit. The business reviews are viewable via a web browser and individual business units are provided the capability for uploading their individual business dashboards to the central repository. The capabilities facilitate information sharing and appropriate security safeguards are built into system 10 (shown in FIG. 1). The dashboards are visible to anyone having access to the electronic boardroom and the person who has created an individual business dashboard retains the capability to edit and delete the dashboard. The use of dashboards drives accountability and derives benefits such as ease of understanding and turn-around. Access to the dashboards of each business unit is restricted by business unit, however certain users are able to access all dashboards.

A boardroom calendar within system 10 works in conjunction with a board agenda and provides information about upcoming deal review meetings and other items for review. Business units waiting to have deals reviewed are able to access system 10 and are able to see updates of the board agenda as the meeting progresses.

System 10 is further configured to provide real time collaboration via virtual meetings. Virtual meetings are facilitated via real time chat capability and virtual whiteboard and slide presentations. Question and comments are addressable without disruption of the meeting flow. Presenters are given capabilities to control the presentation of the data to ensure the proper information is being presented to the participants as it is being discussed.

Figure 5:
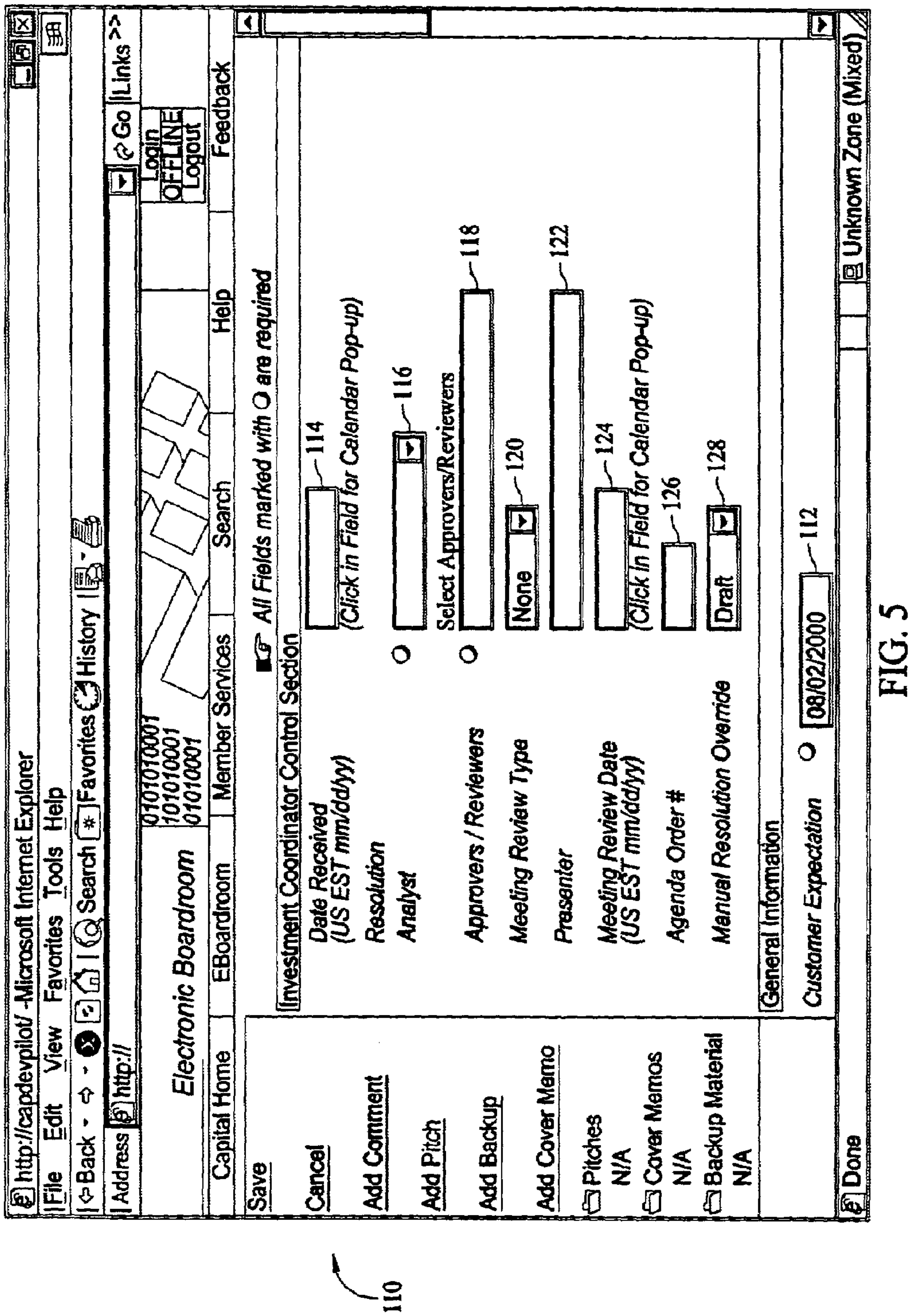
FIG. 5 is a user interface showing fields used by an investment coordinator entering a deal.

Embodiments of a system configured as an electronic boardroom are described below. In one exemplary embodiment, information relating to a new business deal is entered by an investment coordinator into data entry fields within a business deal entry user interface 110, as shown in FIG. 5, and stored into a business deal database. The specifics of the deal were received by the investment coordinator from a particular business unit. In one embodiment, the specifics are entered using a user interface (not shown) stored in the business deal database within system 10. The information contained within the business deal database is organized and reported in a customized, consistent interface to subsequent users and reviewers. Examples of such information entered by an investment coordinator include but are not limited to, customer expectation dates 112, a received date 114, a choice of analyst 116, and a list of approvers and reviewers 118. Other data entry fields where data is entered for upload into the business deal database include a meeting review type 120, a presenter 122, a meeting review date 124, an agenda order number 126 and a manual resolution override field 128. Customization within the database focuses on business specific metrics including those listed above. Providing users with consistent interfaces facilitates concentration on deal specifics rather than formatting issues. The business deal database includes information relating to the business transaction and provides for a centralized administration and accurate, rapid retrieval of the documents.

Information within the databases are organized by system 10 (shown in FIG. 1). The information is organized in accordance with one or more databases making up a knowledge base. In one embodiment, and as described above, the knowledge base includes information relevant to organizing a business deal. One example of information included in such a knowledge base includes, but is not limited to deal headers. Deal headers include, but are not limited to the name of the client or deal alias, functionality, submission, customer expectation date, business unit, contact name and phone, business unit review status, board review status, dollar amount of funding request and any other identifying information. In an alternative embodiment, information is edited or deleted. In another specific embodiment, when customer expectation data is entered into system 10, a delinquency notice is automatically reported to a user. Also, system 10 is configured to implement quality initiatives driven by customer expectations.

Figure 6:
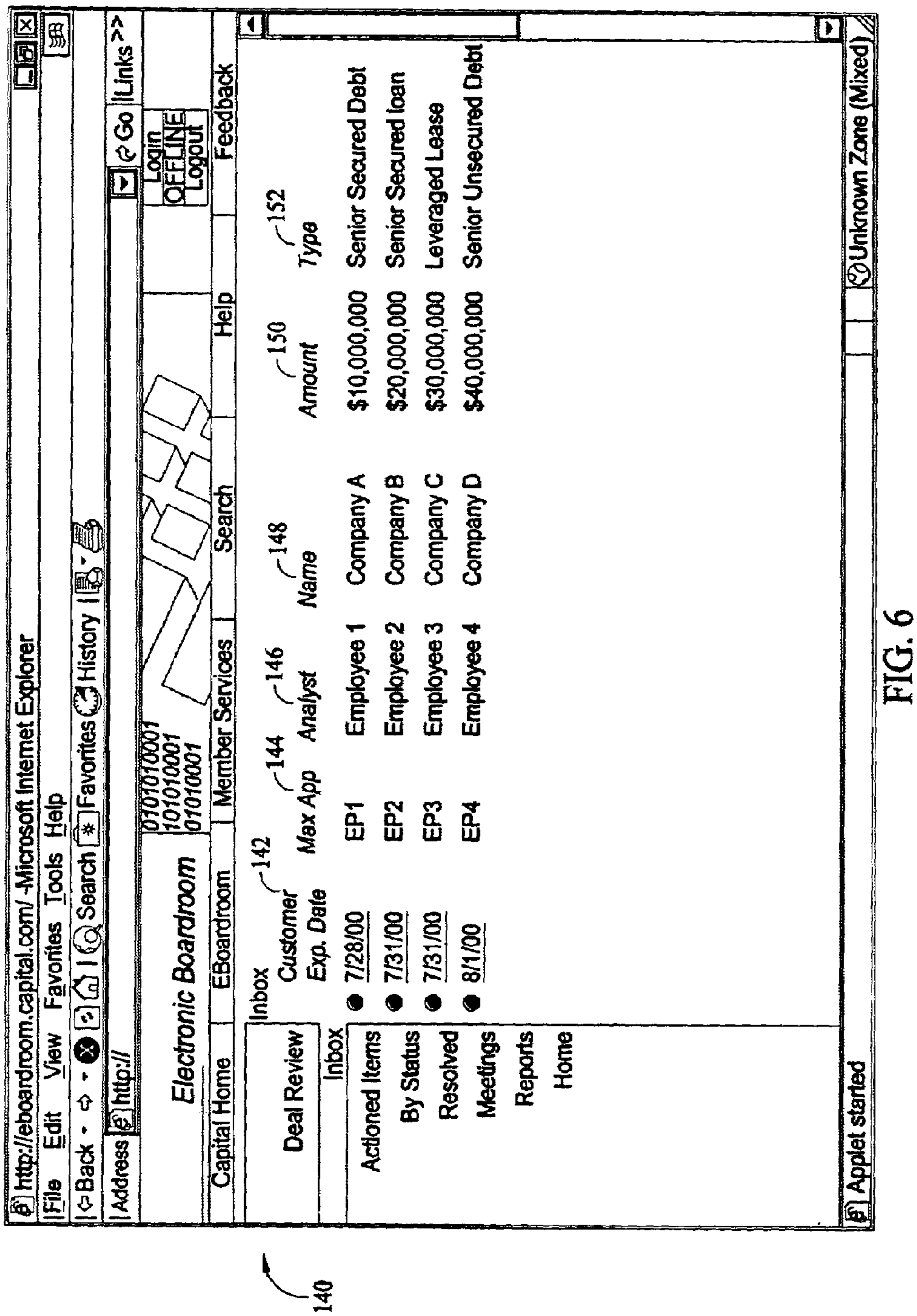
FIG. 6 is a user interface configured as a deal review inbox.

FIG. 6 is an exemplary embodiment of a user interface 140 configured as a deal review inbox for an electronic boardroom according to the present method. User interface 140 is one embodiment of a web page presented to a deal reviewer as a reminder of deals to be reviewed. User interface includes, for each deal listed, a customer expectation date 142, initials of the maximum approver 144, the name of the SRM/analyst 146, a name 148 of the deal, an amount 150 of the deal, and what type 152 of deal is proposed. The names of each deal listed under name 148 are, in one embodiment, configured as links, such that the reviewer can select a link and be presented with the deal pitch and the specifics of the deal to be reviewed as described below.

Figure 7:
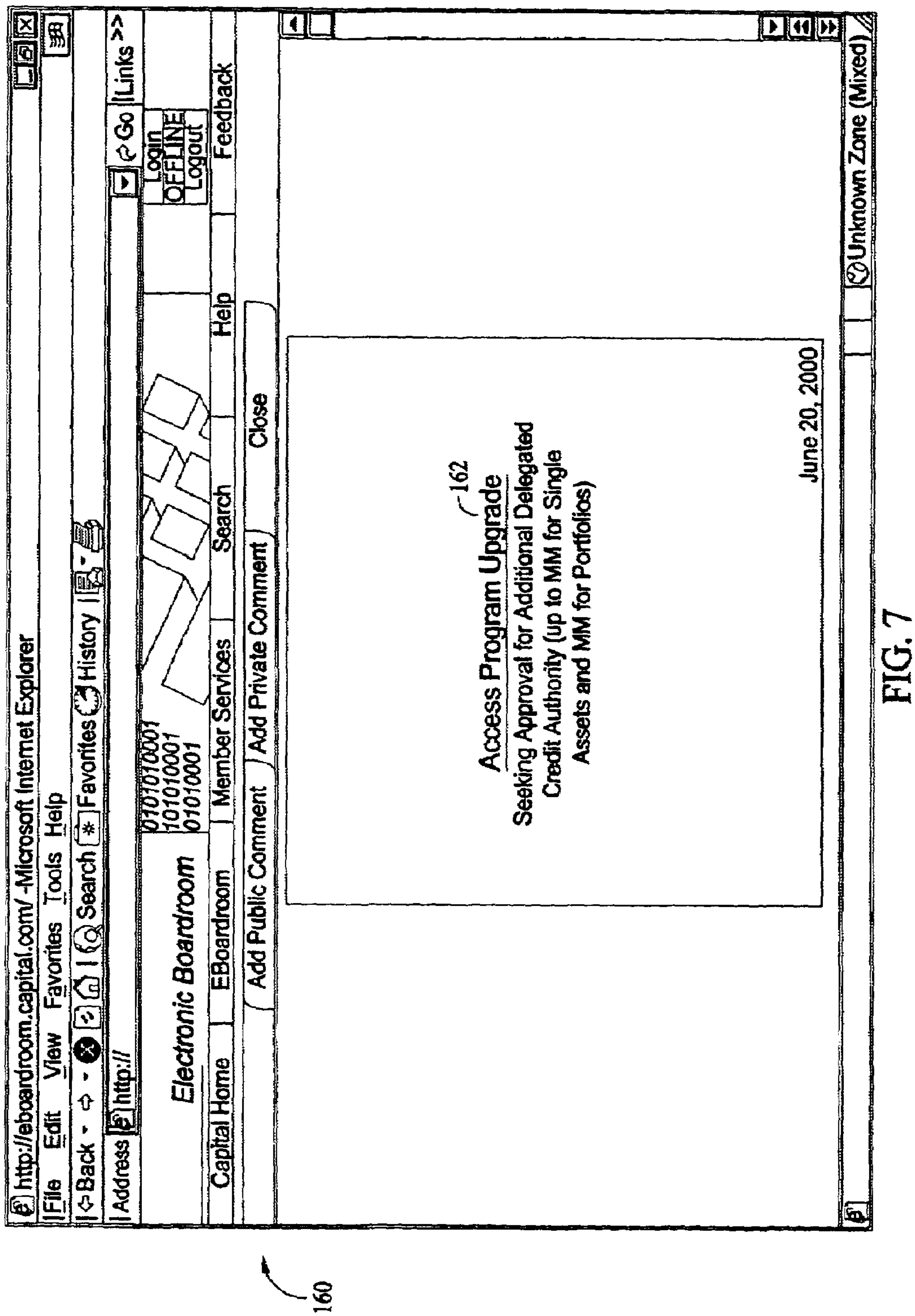
FIG. 7 is a user interface depicting a deal pitch.

FIG. 7 is a user interface 160 depicting a deal pitch. A deal pitch is a short description of the deal proposed and based upon the short description the reviewer can decide if that particular deal is the one he or she wants to review. In one embodiment, a deal name 162 is configured as a link to a web page where deal specifics can be reviewed.

Figure 8:
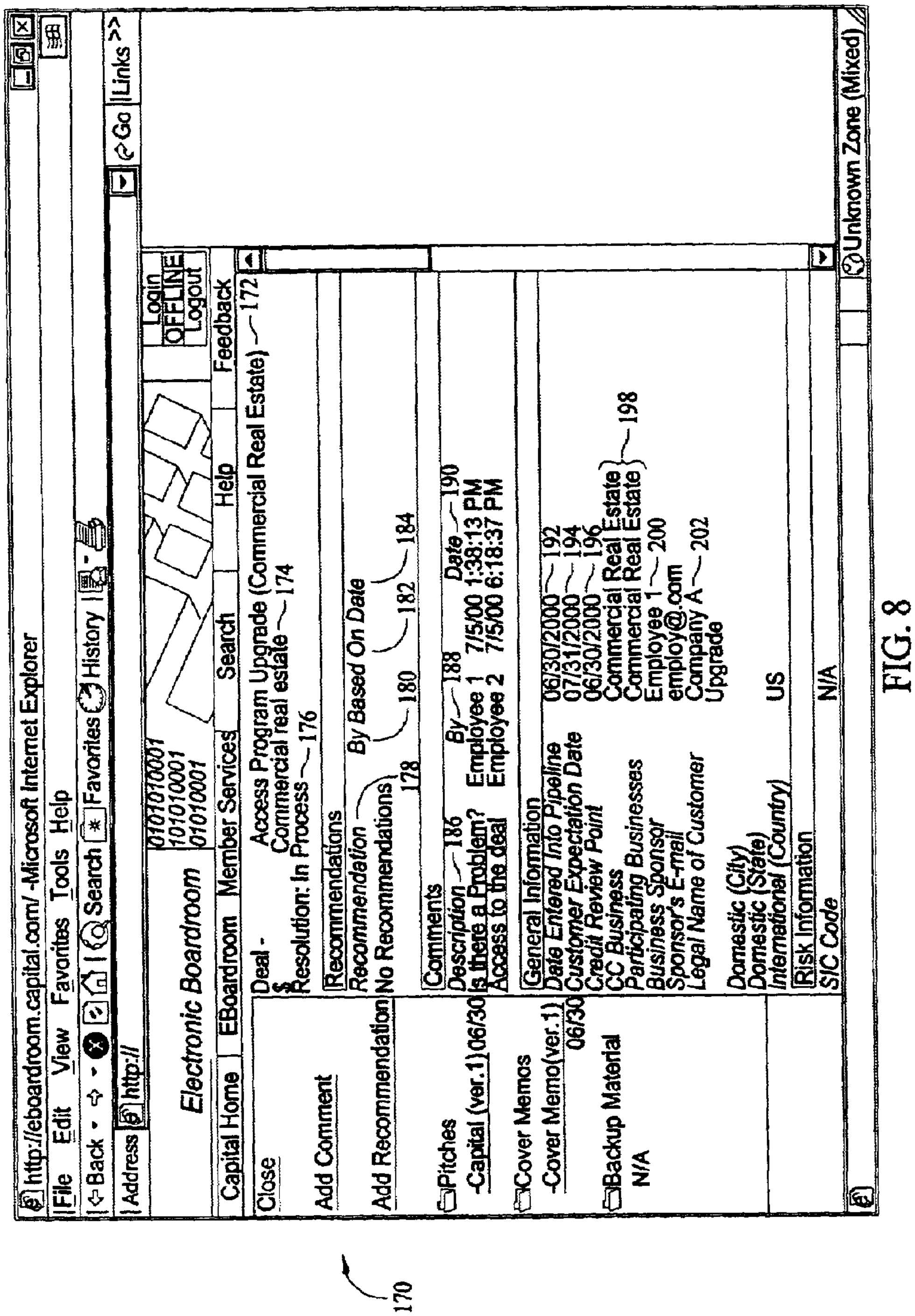
FIG. 8 is a user interface configured as a web page which contains specifics of a deal for review.

FIG. 8 is one embodiment of a user interface 170 configured as a web page which contains specifics of a deal for review. Interface 170 is typically accessed by selecting a link from a deal pitch user interface, for example, user interface 160, as shown in FIG. 7. User interface 170 includes a deal name 172, a deal amount 174, resolution status 176 information, recommendations 178, the author of the recommendations 180, information about the document subject to the recommendation 182 and the date 184 of the recommendation. Comments, including description 186, the author of the comment 188 and the date 190 of the comment, are also included on user interface 170. Other deal specific information is included, including a date the deal entered the pipeline 192, a customer expectation date 194, a credit review point 196, which business units are involved 198, the deal sponsor 200, and the legal name 202 of the customer. Other deal specific information can, of course, be included. In one embodiment, system 10 is configured to delete entered comments after a pre-defined time period, for example, 30 days.

Figure 9:
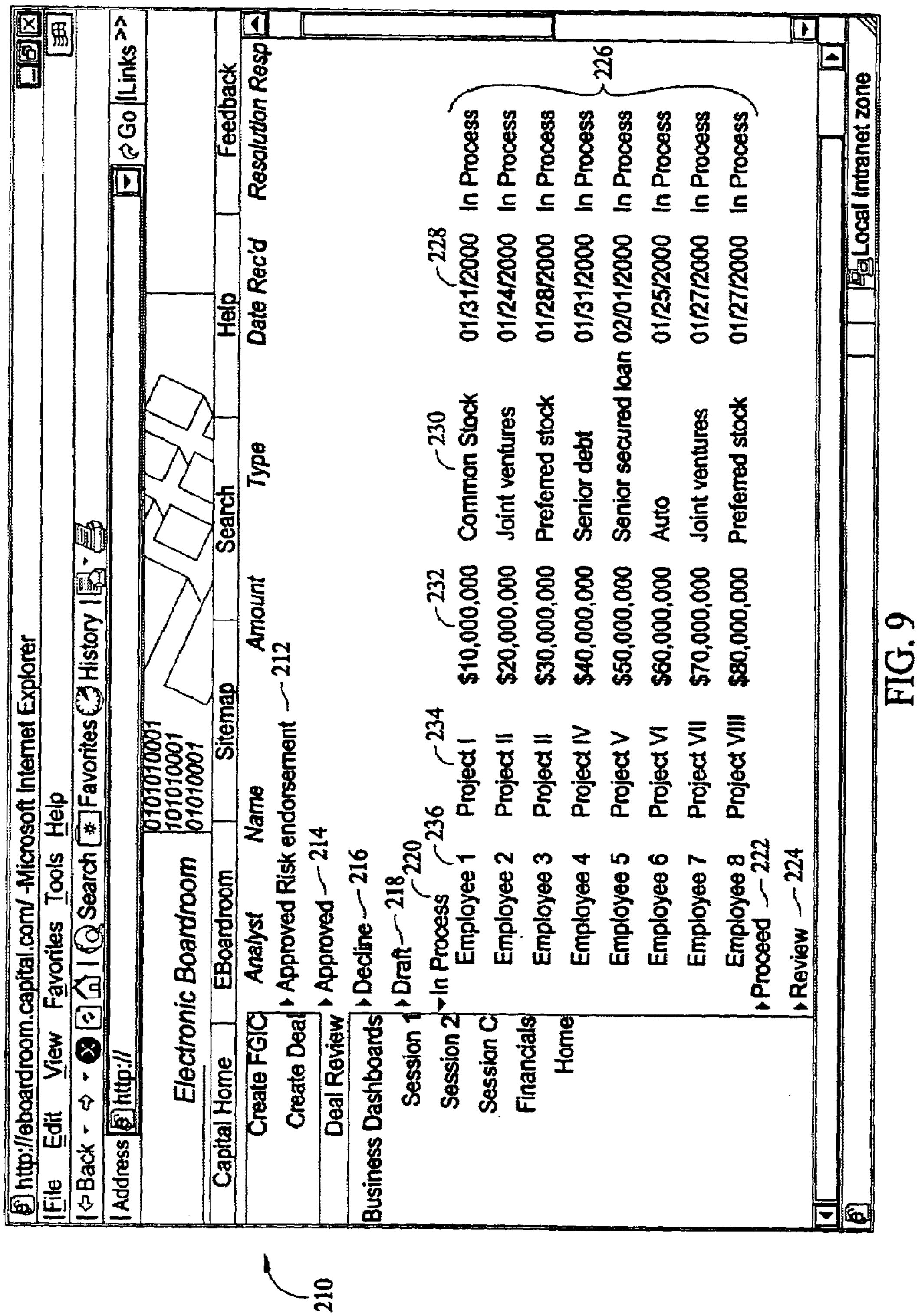
FIG. 9 is an illustration of a user interface where deals in all phases of progress can be accessed.

FIG. 9 is an illustration of a user interface 210 for an electronic boardroom showing one embodiment where deals in all phases of progress are accessed. User interface 210 includes links where an approved user can view deals such as those approved without risk endorsement 212, approved deals 214, declined deals 216, deals being drafted 218, deals in process 220, deals that are proceeding 222, and deals requiring rework after a review 224. As shown in FIG. 9, deals in process 220 has been selected and the user is presented with a list 226 of the deals in process. Other general information is included in list 226, including a date the deal entered the pipeline 228, deal type 230, an amount of the deal 232, a party to the deal 234, and a responsible person 236 for the deal.

In another embodiment, the information received and stored by system 10 (shown in FIG. 1) is tracked. As used herein, track means to monitor and/or update. Accordingly, as the information relating to the deal changes, for example, an appending which adds new information to the deal, the databases containing that information are automatically updated and the reviewers are automatically notified of the changes. Users making changes are prompted to record the nature of their entered changes in a history log. Changes or comments regarding a deal which a user may enter are restricted by the access level for that user as described below.

System 10 (shown in FIG. 1) reports information relating to the deal to the user. The user may receive a report at any stage during a deal. In one specific embodiment, system 10 reports the information using e-mail. In yet another specific embodiment, a pre-defined recipient automatically receives an e-mail or other report upon the occurrence of at least one of a recommendation or comment being made to an author's input information, a change in status of a deal or owner, arrival of a deal and a deal being in condition for corporate review. A pre-defined user also receives a report when a last reviewer has reviewed the information. In a specific embodiment, system 10 is configured to report information to at least two users simultaneously. In yet another embodiment, the report is a summary report.

Although the descriptions heretofore describe the methods embodied in system 10 in terms relating to a business deal, it is to be understood that the descriptions for the electronic boardroom apply for any aspect of business or business management. Examples of such aspects include, but are not limited to business development, financial statements, compliance issues, employees, and quality, several of which are described below.

Figure 10:
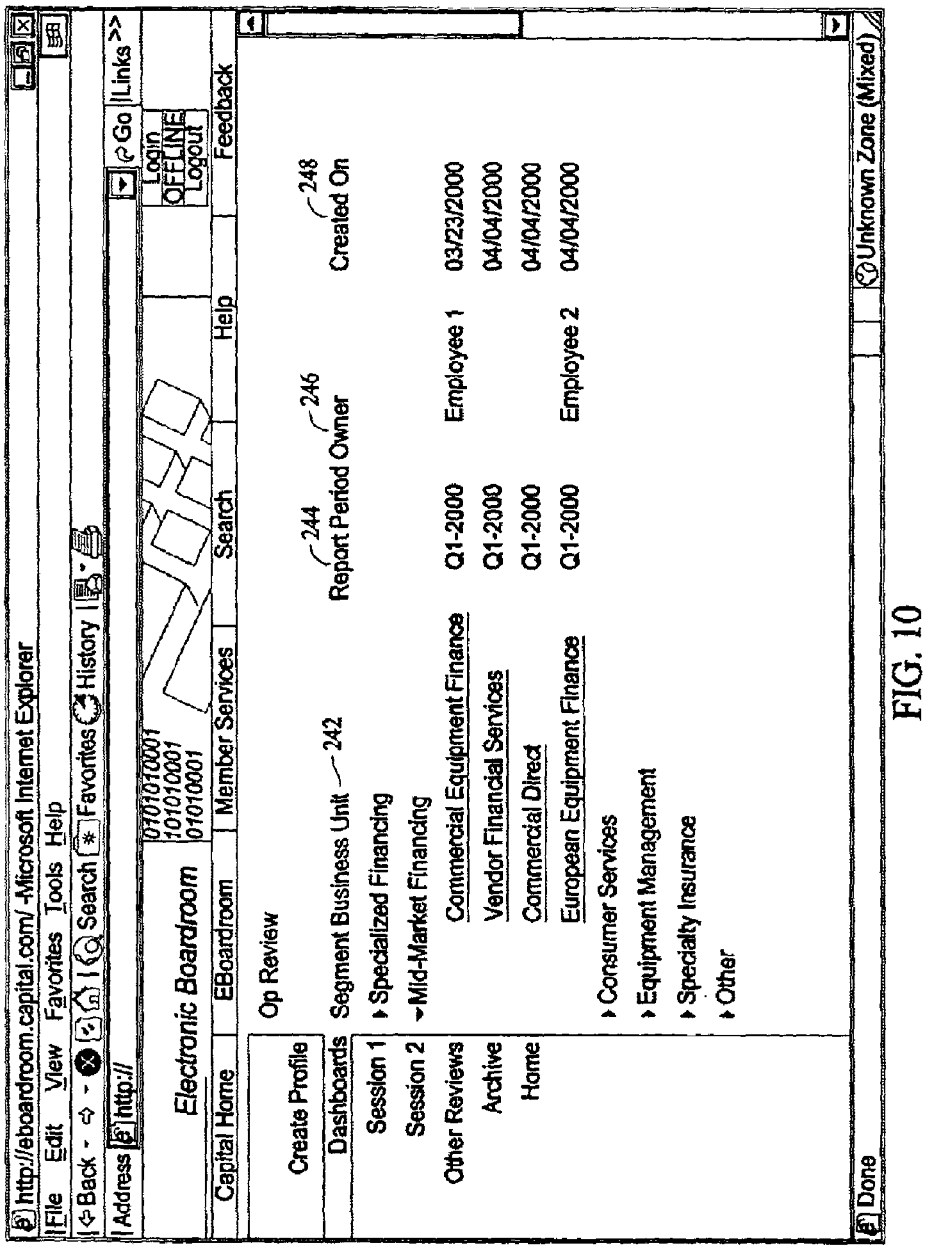
FIG. 10 is an illustration of a web page where a user has selected to view business reviews.

FIG. 10 is an illustration of a web page including a user interface 240 where a user has selected to view business reviews, commonly called dashboards. As shown in FIG. 10, the particular user is able to choose dashboards from several segment business units. Information available on user interface 240 includes business units 242, a reporting period 244, an owner 246 of the individual dashboard and a dashboard created date 248. A user is able to select one of several listed business units in order to view accessible dashboards for that business unit.

Figure 11:
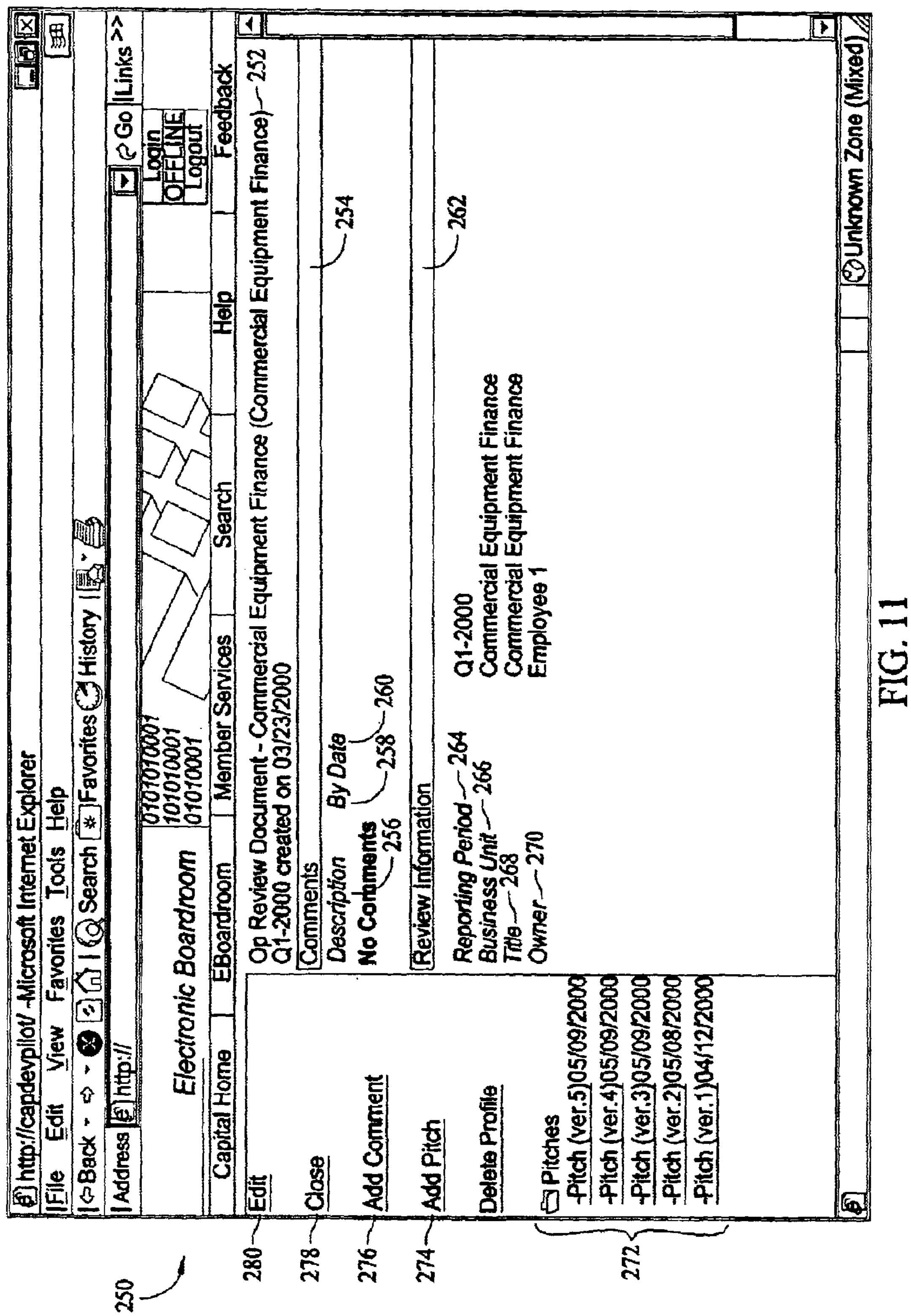
FIG. 11 is a exemplary example of a business review.

FIG. 11 is an exemplary example of a user interface 250 configured as a dashboard. User interface includes a title 252, a comments section 254 including a description 256, an author 258 of the comments, and a date 260 of the comments. Also included is a review information section 262 including a reporting period 264, a business unit name 266 and title 268 and the owner 270 of the dashboard. Links are provided that the user might access pitches 272 which contain the business unit information for review. There may be several versions of pitches 272 available. In addition the user may add a pitch 274, add comments 276 or close 278 the business review (dashboard) page. An edit 280 link is also available. Pitches in the business review context are best described as slide presentations available to the business reviewer.

Figure 12:
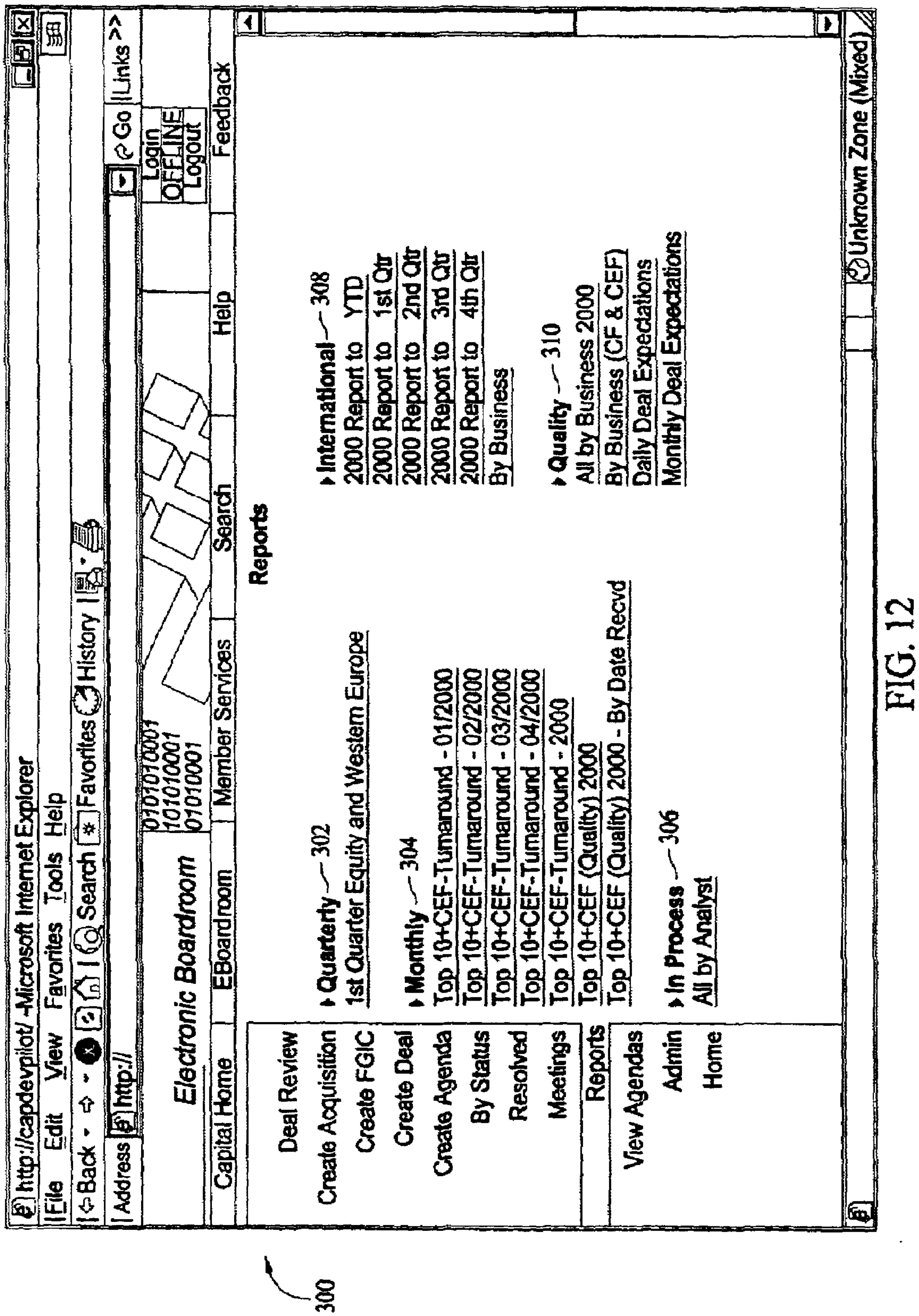
FIG. 12 is an exemplary example of a business reports home page.
Figure 13:
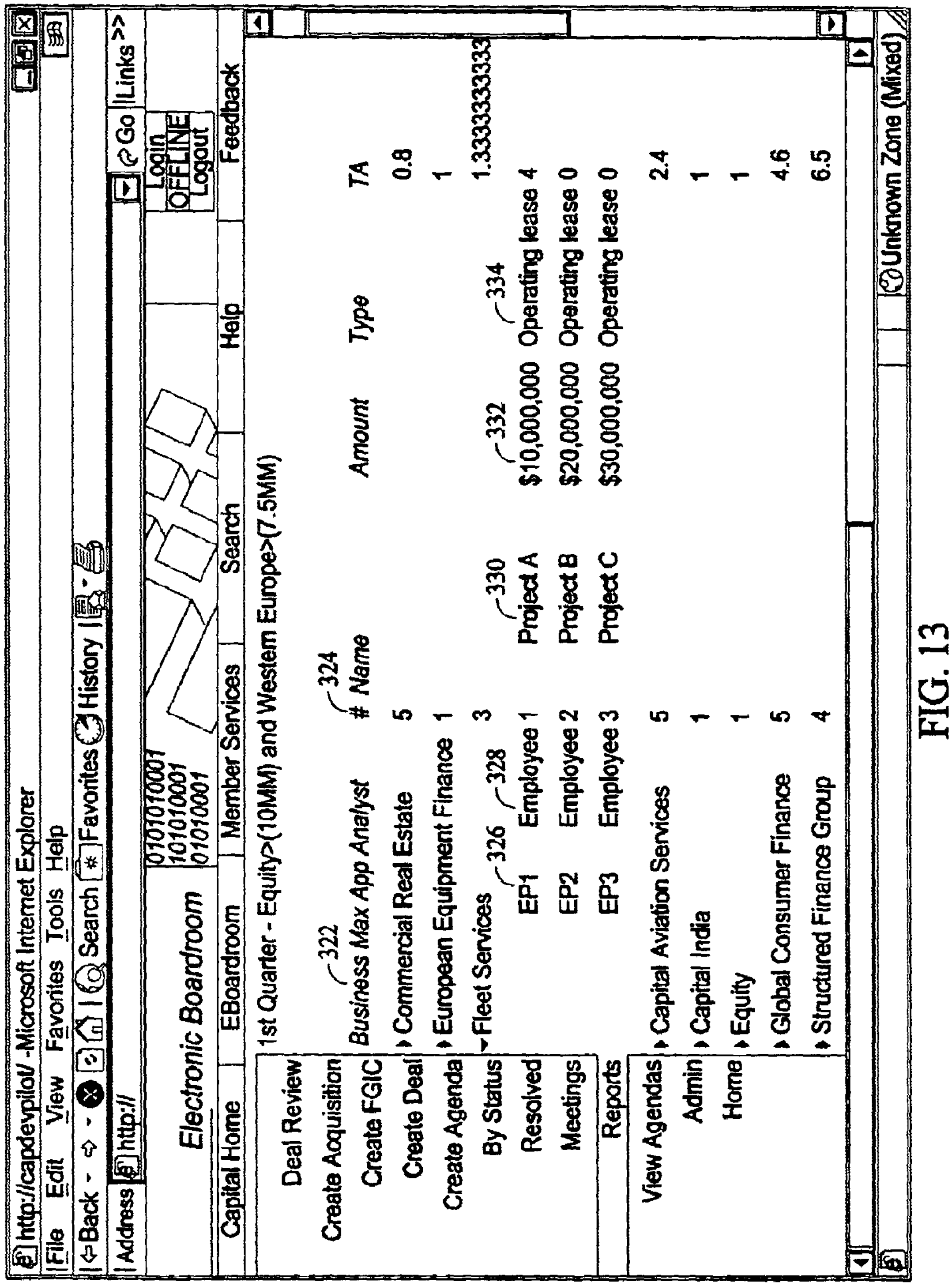
FIG. 13 is an exemplary example of a quarterly report.

Another embodiment of an electronic boardroom allows a user to view business reports. An exemplary example of a business reports home page 300 is shown in FIG. 12. Page 300 includes selectable links where authorized users can select, for example, business reports on a quarterly 302, monthly 304, in process 306, international 308, or quality 310 basis. Other embodiments exist which are not shown in FIG. 12. After selecting on which basis the individual user wishes to view reports, for example, quarterly, available reports are displayed which are selectable. FIG. 13 is an exemplary example of a quarterly report 320. Report 320 includes a listing of all businesses 322 within a company and a number of deals 324 entered into by the business. Businesses 322 are selectable and upon selection of one of the businesses, a listing of the businesses transactions are displayed including a maximum approver 326, an analyst 328, a name 330 for the transaction, an amount 332 of the transaction, and a transaction type 334. Transactions are also selectable, in one embodiment, as links to a transaction information page.

Figure 14:
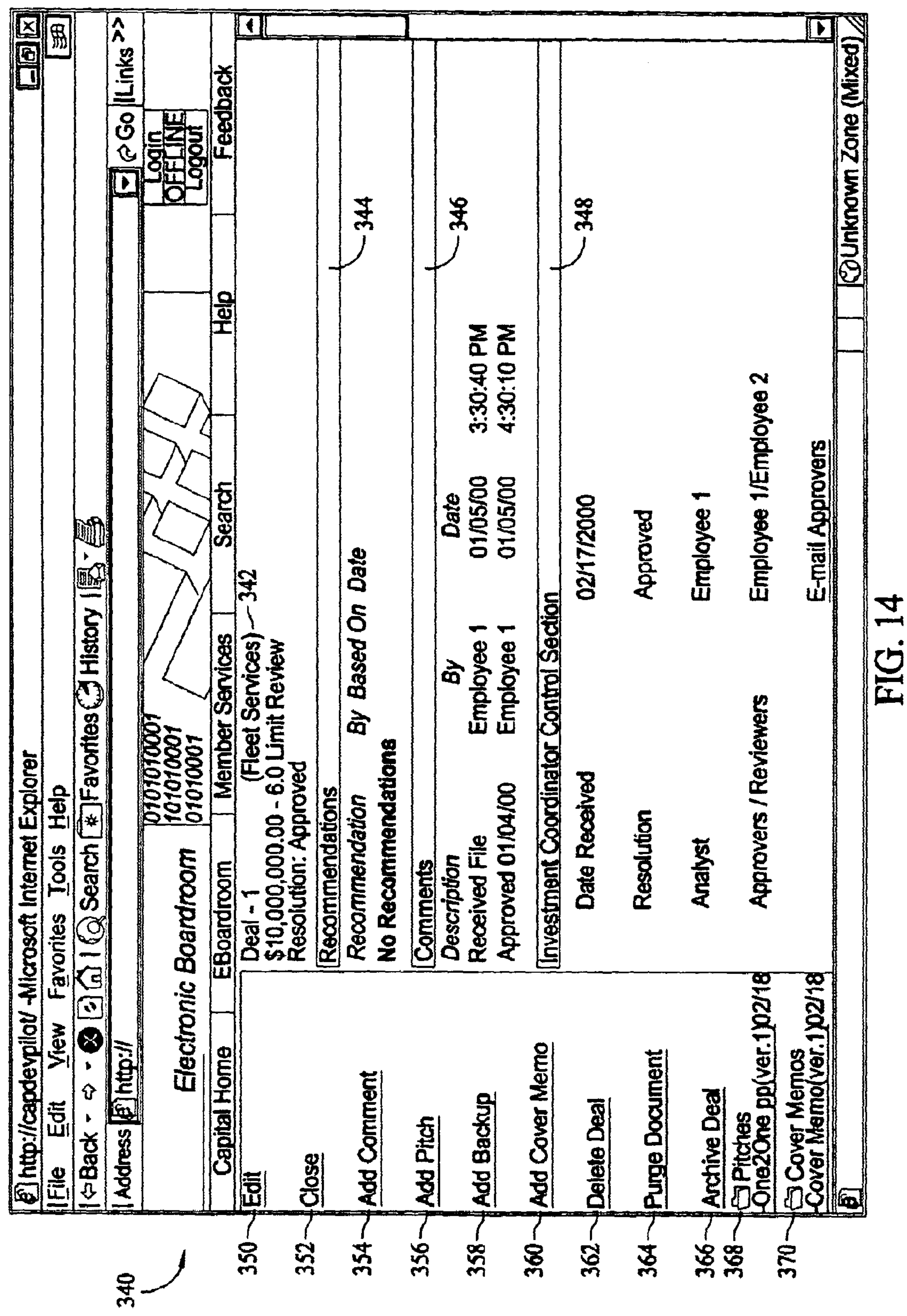
FIG. 14 is an example web page depicting a transaction selected from a report in FIG. 13.
Figure 15:
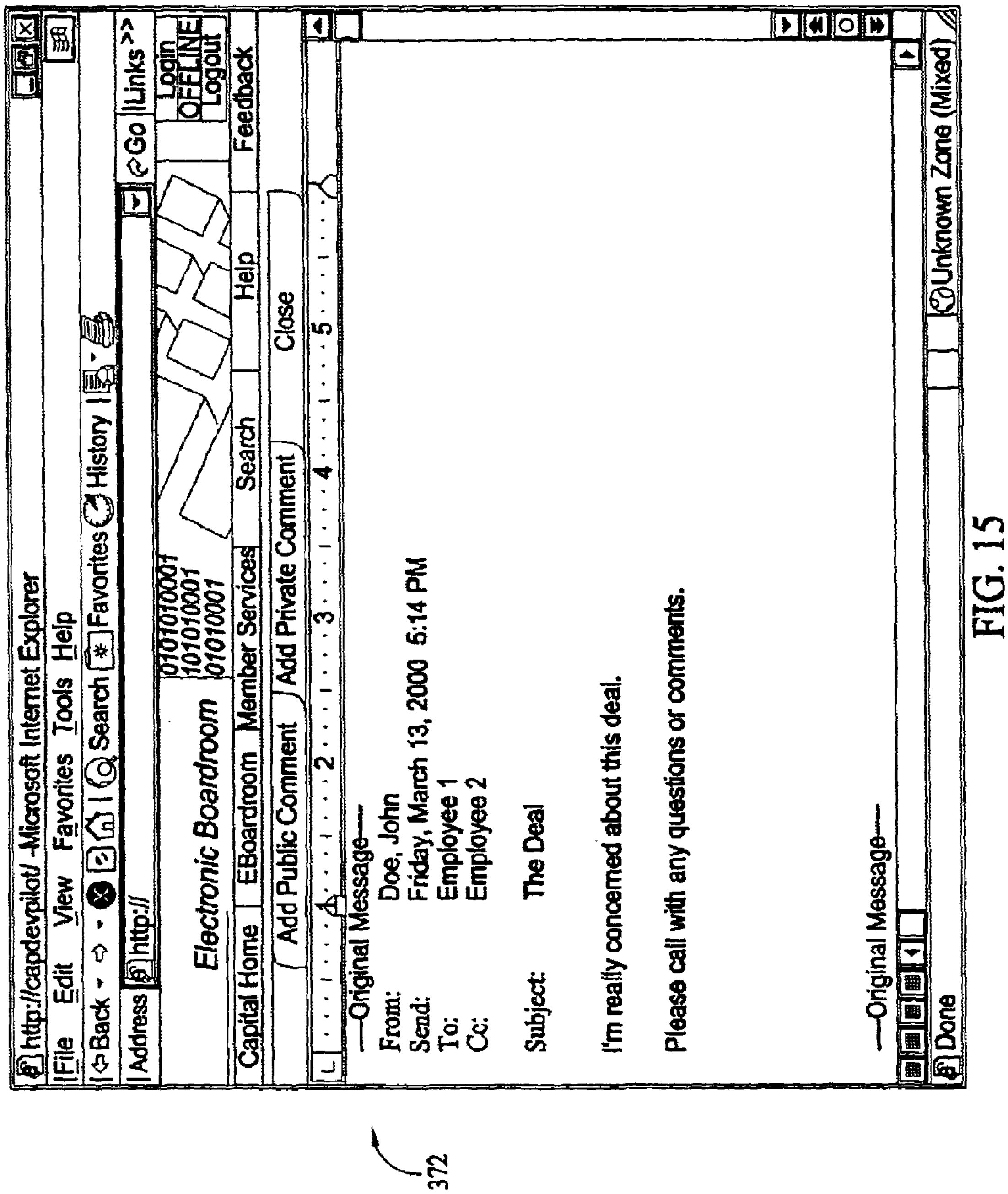
FIG. 15 is an embodiment of a web page configured as a cover memo.

FIG. 14 is an example web page 340 depicting a transaction selected as described in FIG. 13. Page 340 includes a name 342 of the transaction, recommendations 344 and comments 346 and an investment coordinator control section 348. Names 342, recommendations 344, and comments 346 are the same as described in FIG. 11. Investment coordinator control section 348 includes fields as described in FIG. 5. Page 340 further includes links to edit 350, close 352, add a comment 354, add a pitch 356, add backup material 358, add a cover memo 360, delete a deal 362, purge a document 364, or archive a deal 366. Other links are included to allow a user to view a pitch 368 or view cover a cover memo 370. FIG. 15 is one embodiment of a web page 372 configured as a cover memo.

Figure 16:
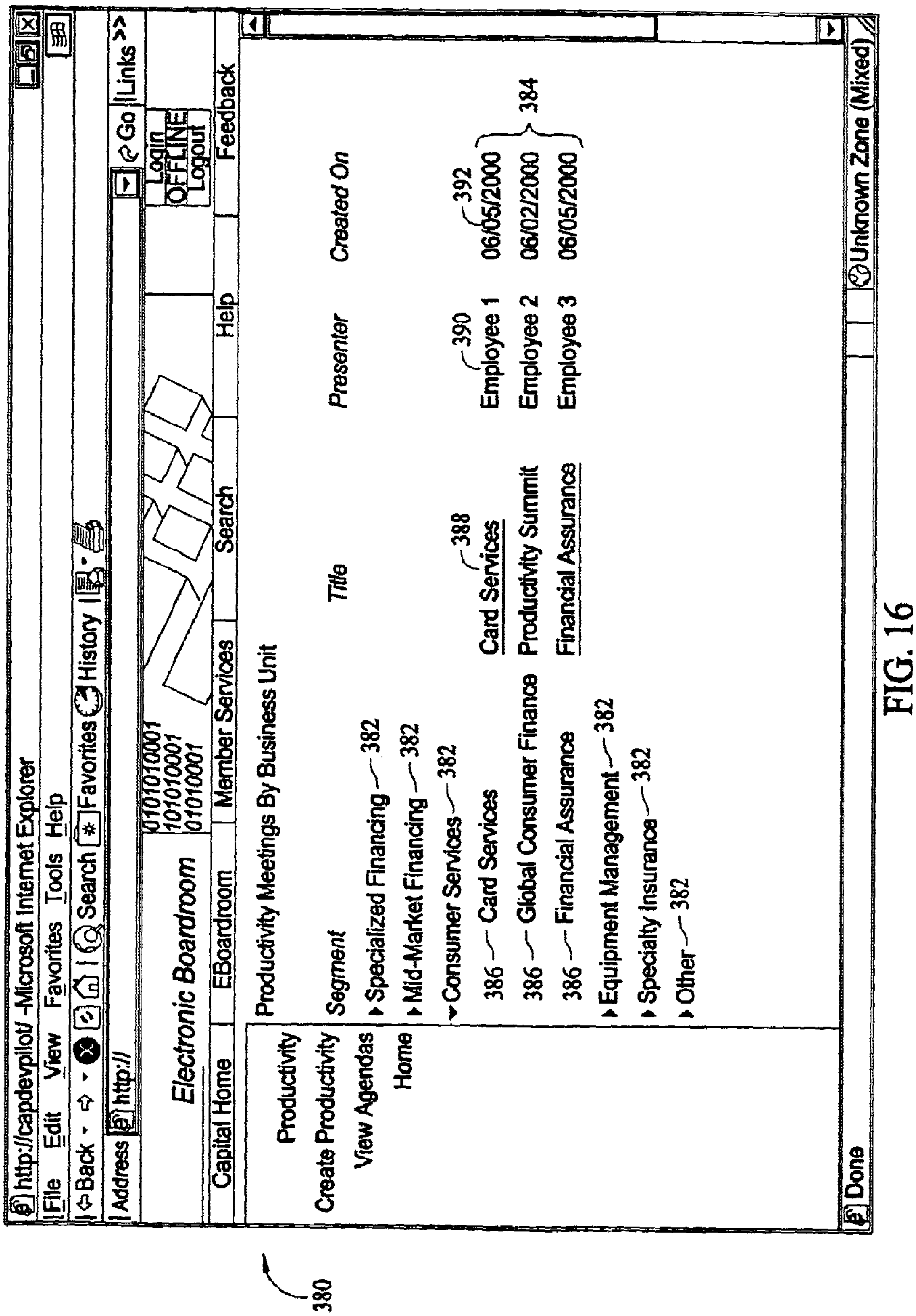
FIG. 16 shows one embodiment of a web page configured to access productivity meetings according to business unit.

An electronic boardroom is further configurable as a productivity tool. FIG. 16 shows one embodiment of a web page 380 configured to access productivity meetings according to business unit. Selecting a segment 382 of a business provides a user with a listing 384 of the productivity presentations developed for each business unit 386 within the segment 382. Included in listing 384 along with business units 386 are a title 388, presenter 390, and a creation date 392. Selection of a title 388 presents a user with a web page (not shown) similar to those described in FIGS. 11 and 14 including a title section, a comments section and links to pitches which in this case are slides of the productivity presentation, which in turn provide links to a page (not shown) where comments can be added to a presentation, or the presentation can be viewed, edited or deleted.

Figure 17:
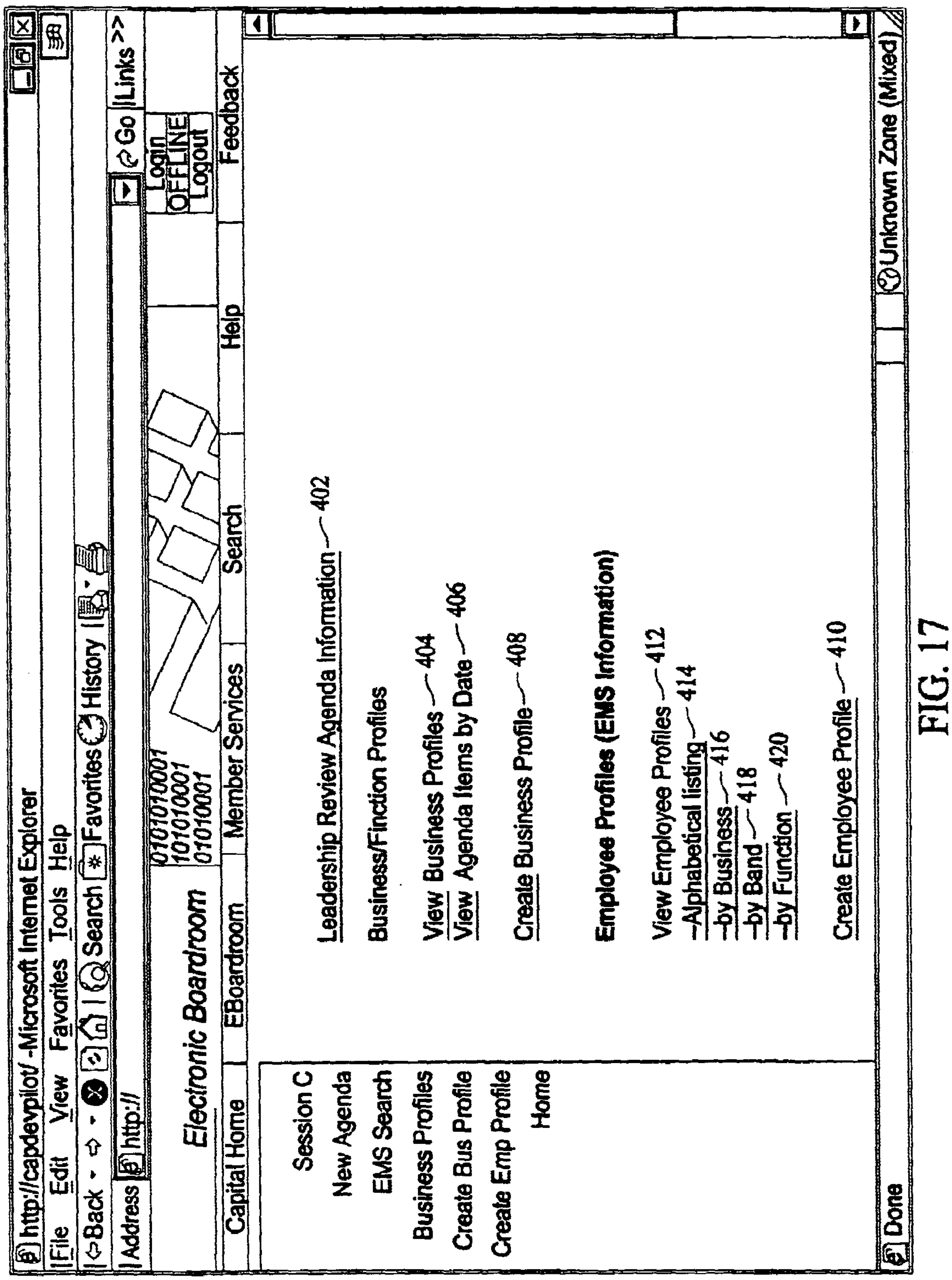
FIG. 17 is an embodiment of a web page configured to provide access to business/function profiles and employee profiles.

The electronic boardroom is further configurable to be used as part of an employee review and compensation process. FIG. 17 is an embodiment of a web page 400 configured to provide access to business/function profiles and employee profiles. Included in page 400 are links to view review agenda information 402, view business profiles 404, view agenda item by date 406, and to create a business profile 408. Employee profiles 410 can be created. Employee profiles are also viewable. In addition to a link to view employee profiles 412, links exist to group employee profiles for viewing by alphabet 414, by which business 416, by band 418 and by function 420.

Figure 18:
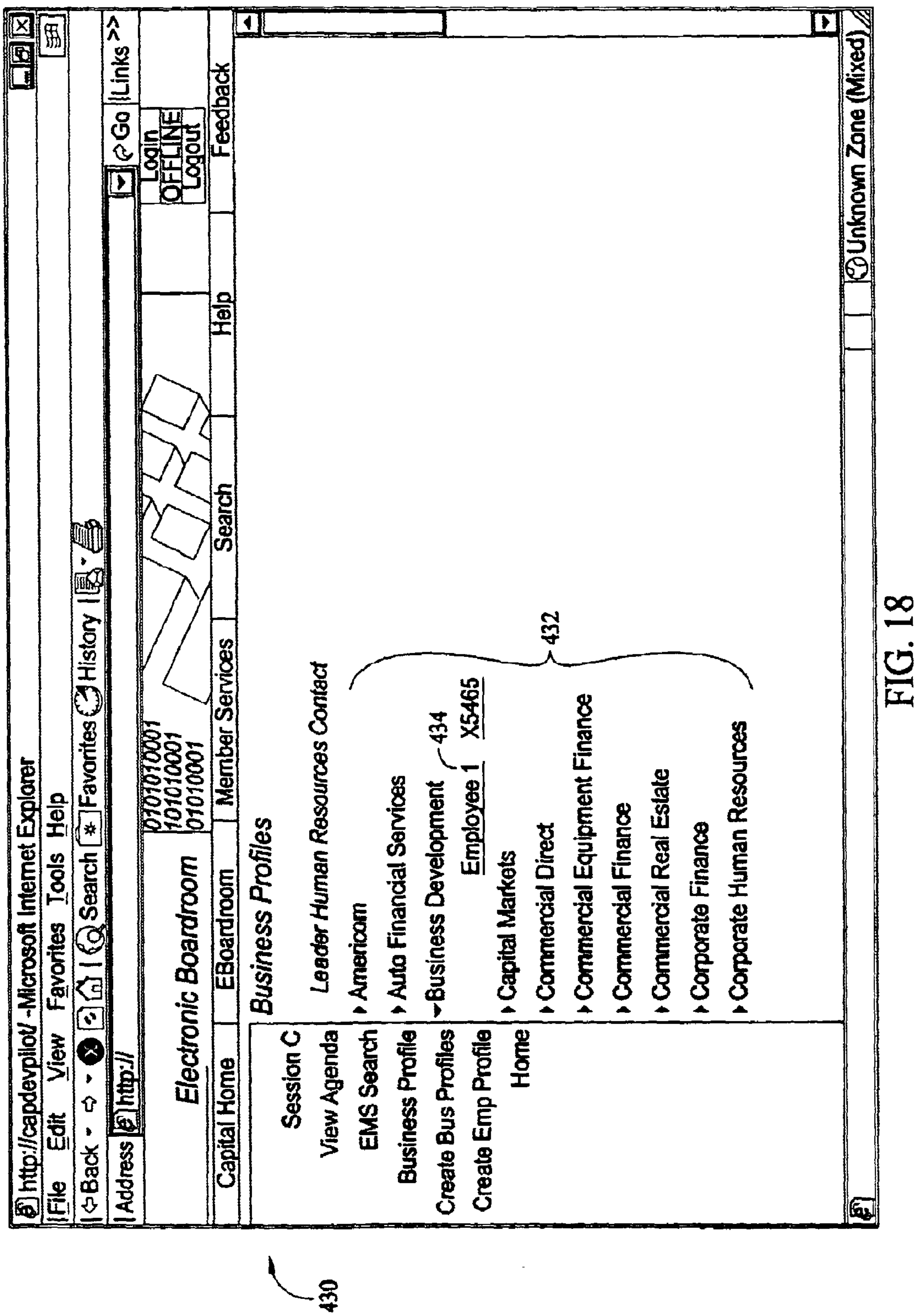
FIG. 18 is an exemplary embodiment of a page presented to a user who has chosen to view business profiles.

FIG. 18 is an exemplary embodiment of a page 430 presented to a user who has chosen to view business profiles 404 (shown in FIG. 17). Included in page 430 is a list 432 of businesses which are selectable. Upon selection of one of the businesses from list 432, a human resources contact 434, and their contact information is displayed.

Figure 19:
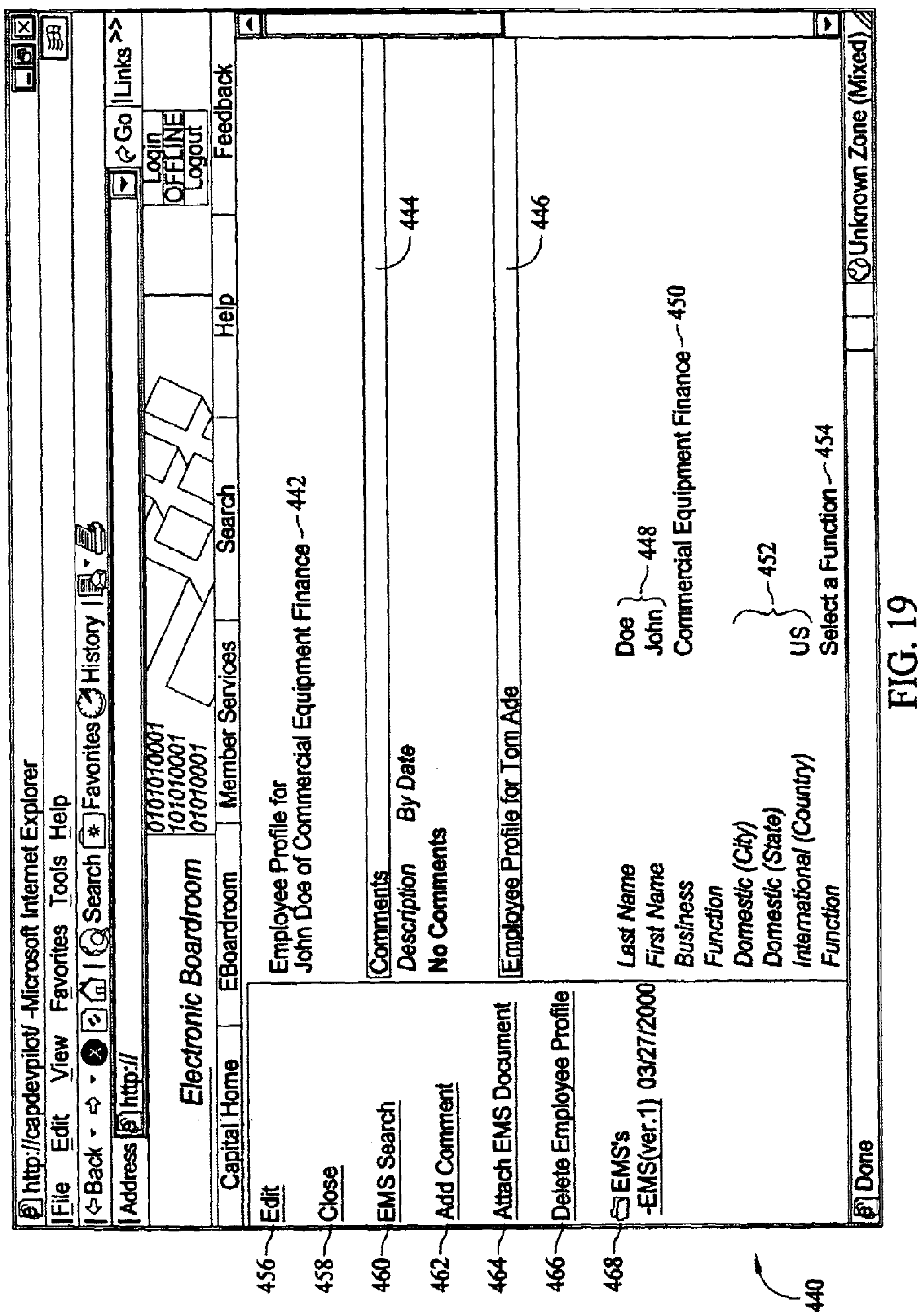
FIG. 19 is an exemplary embodiment of an employee profile page.
Figure 20:
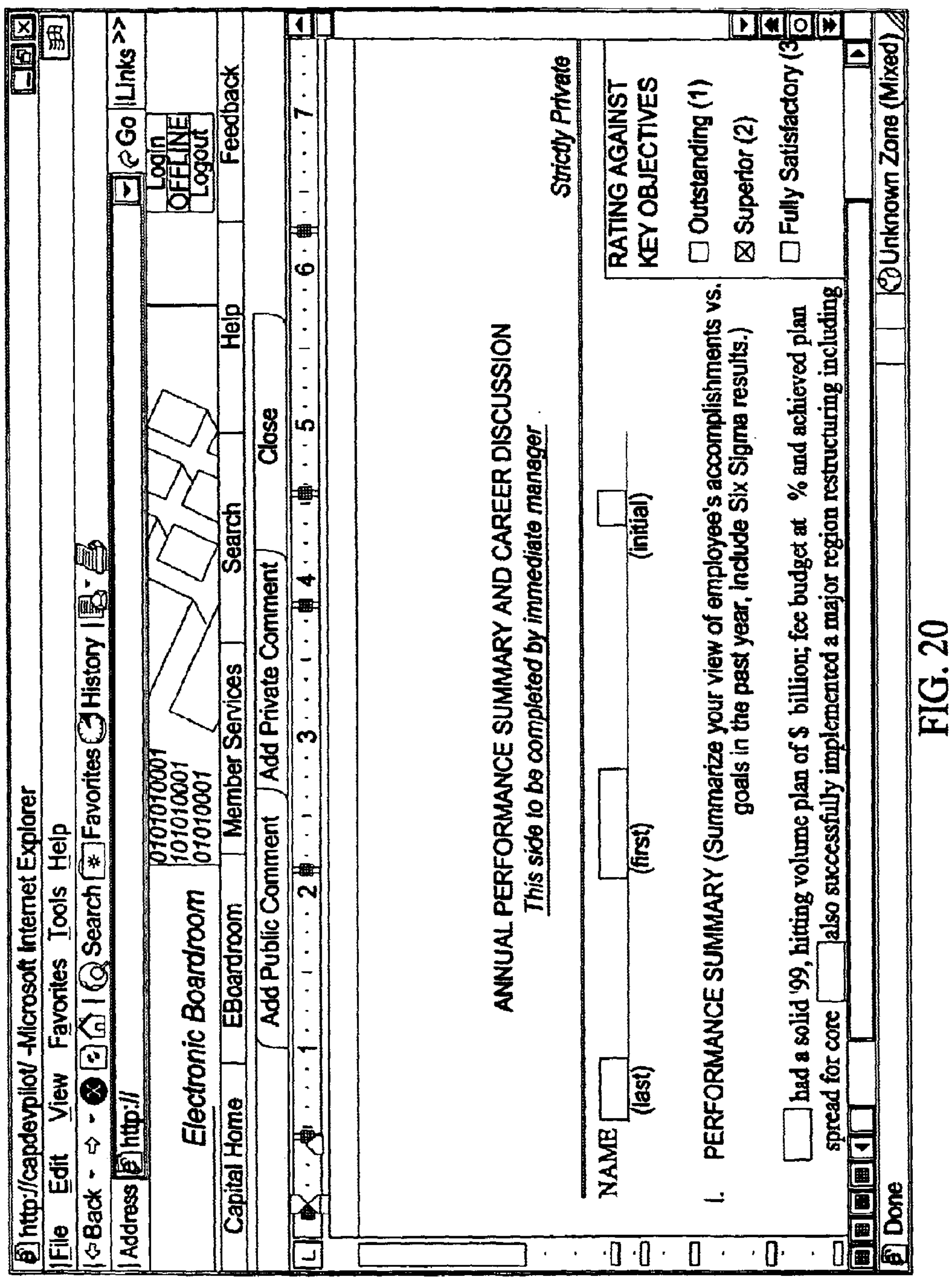
FIG. 20 is an example employee review.

FIG. 19 is an exemplary embodiment of an employee profile page 440 presented to a user who has chosen to view employee profiles 412 (shown in FIG. 17), and has selected a particular employee, for example, from alphabetical listing 414. Included in page 440 is an employee name and business unit 442, a comment section 444, into which reviewers can enter comments regarding the particular employee, and an employee profile 446. Included in employee profile 446 is employee information including name 448, business unit 450, location information 452, employee function 454 and other employee pertinent information not shown in FIG. 19. Other links include edit 456 employee profile, close 458 employee profile, a search 460 for other employee review information, add comments 462 to employee profile, add an employee review document 464, and delete 466 an employee profile. Employee reviews 468 are selectable as links, for viewing or editing, an exemplary example of which is shown in FIG. 20 as a page 470.

Figure 21:
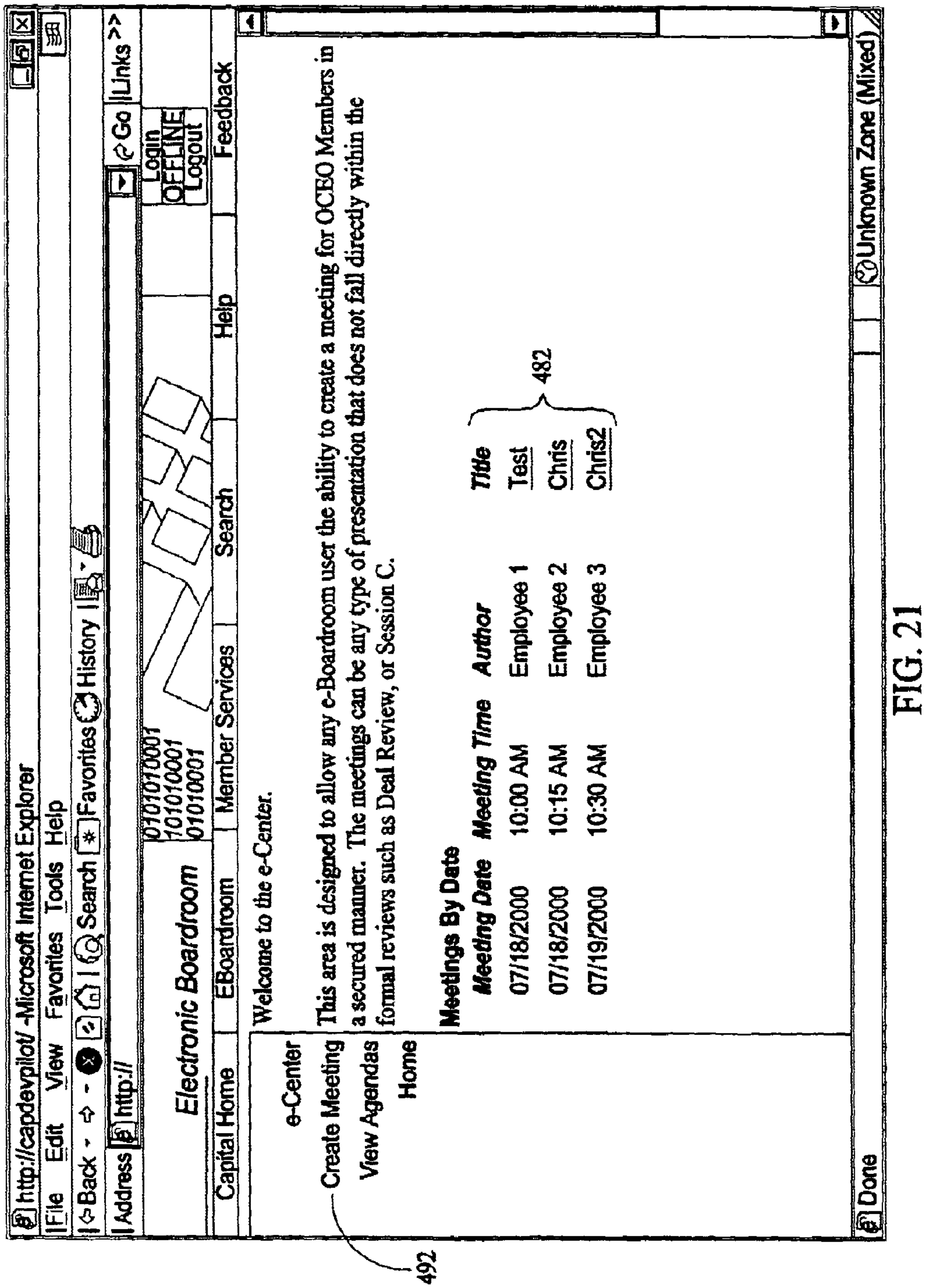
FIG. 21 is an exemplary embodiment of an e-center homepage.

FIG. 21 is an exemplary embodiment of an e-center home page 480 presented to a user who has chosen to create a meeting from the electronic boardroom home page (shown in FIG. 2). Included in page 480 is an agenda 482 for scheduled meetings the user is to attend, virtual or otherwise. Included in agenda 482 is a meeting date 484, meeting time 486, an author of the meeting 488 and a title 490 of the meeting. Alternatively, the user can select a create meeting link 492, which allows the user to create a meeting, including those elements as described for an agenda 482 and including a list of attendees.

Figure 22:
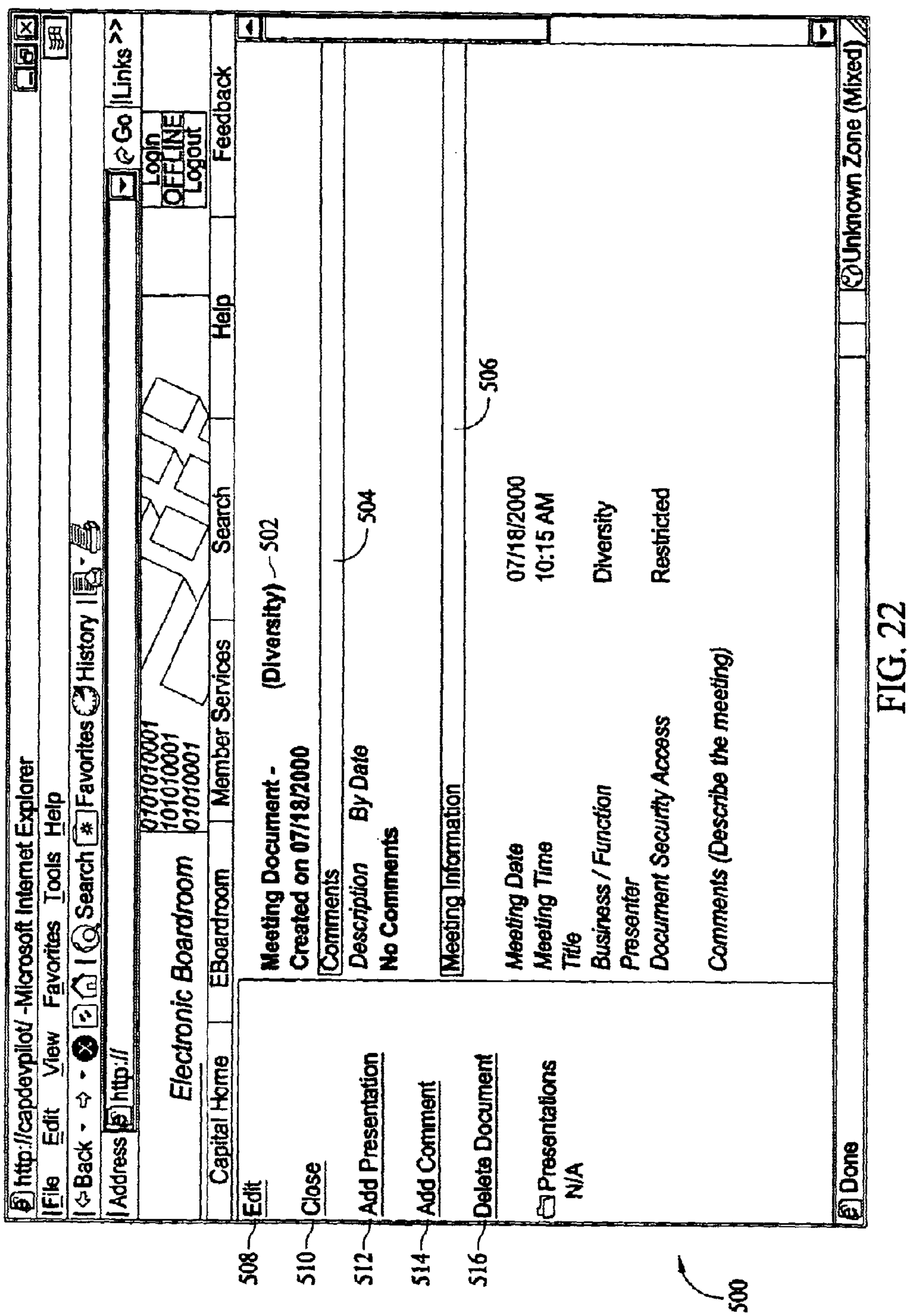
FIG. 22 is an exemplary example of an e-center meeting notification.

FIG. 22 is an exemplary example of an e-center meeting information page 500 presented to a user who has chosen one of the meetings from e-center home page 480 (shown in FIG. 21). Included in page 500 a meeting title section 502, a comments section 504 and a meeting information section 506. In addition the user may edit 508 the meeting information, close 510 the meeting page, add 512 a presentation to the meeting, add comments 514 or delete 516 the meeting from the e-center.

In another embodiment, system 10 is configured with a portfolio management process (not shown) which is further configured to outline how a particular product (investment) is expected to perform, the triggers that might indicate that the product is not performing, and corrective measures necessary to ensure performance. The portfolio management process includes matrices of key risk factors within the products making up the portfolio. Also included are trigger levels for the key risk factors. Trigger levels are associated with corrective actions to be taken. The risk factors are monitored in an on-going fashion and every product in the portfolio has a matrix of key risk factors.

The portfolio management process operates similarly to the deal review process described above. When a new product to be introduced and become a part of the portfolio of a business, description documents including objectives and matrix of risk factors is submitted to the portfolio management process for approval. Documents are reviewed, tracked and stored like the deals described above. An investment coordinator assigns reviewers and a maximum approver to a product within the portfolio and the reviewers comment and/or make recommendations and a maximum approver approves or disapproves the documents that outline the portfolio. E-mails are sent to appropriate parties when a reviewer or the maximum approver has made a comment or recommendation regarding a product within the portfolio.

Products within the portfolio are grouped according to asset classifications, for example, consumer, insurance, equipment, commercial and specialty. Asset classifications, in one embodiment, include ten to twelve key risk factors. Some asset classifications are global across the entire portfolio, such as delinquencies, credit ratings, losses, while others are business specific, such as lease run-off.

The portfolio management process facilitates tracking of review and approval processes for new products and further facilitates, for example, quarterly reviews of existing products within the portfolio. Submitting of quarterly reviews of product performance against approved portfolio management objectives for the product provides a basis for portfolio management review meetings, which take place anytime, anywhere like the deal review board of directors meeting above described.

User interfaces for the portfolio management process (not shown) within the electronic boardroom are similar to those described for the deal review process and include statuses such as draft, in pipeline, in process, in quarterly review, re-work and approved. Selecting one of the statuses above, for example, in process, provides a user with a list of products within the portfolio awaiting approval from a maximum approver.

Other functions similar to those described above in regard to the deal approval process within the electronic boardroom are implemented in the portfolio management process within the electronic boardroom. For example only the business which owns a product will have access to the product documents in the portfolio while the documents are in process of being reviewed, and only the business will have access to the product performance review of that business.

In still another embodiment, system 10 (shown in FIG. 1) receives and stores user profile information. In many situations, it is desirable to track users of system 10. In addition, the role of the user, for example a member of the board of directors, determines the home page presented to the user upon successful login, the appearance of that home page, notification details and contact information. User contact information may be drawn from a database that includes a directory. User profile information is any information beneficial to the identification of a user and includes, but is not limited to role information and business unit information.

In yet another embodiment, system 10 (shown in FIG. 1) analyzes a user's profile information to restrict access in accordance with a knowledge base. In many situations, it is desirable to restrict access to specific information to specific users. The knowledge base includes any information beneficial to analyzing the user's profile information including, but not limited to information associating role information with user capability. For example, users of system 10 may have several roles, including Business Chief Risk Manager, Investment Coordinator, Chief Executive Officer and System Administrator. A business may desire, for security reasons, that the Business Chief Risk Manager have the authority to submit business deals and dashboards in the databases within system 10. The Business Chief Risk Officer may also have updating and editing capabilities. In a further embodiment, the notification may be sent that a new deal has arrived. The Investment Coordinator, for example, receives notification of the arrival of a new deal has arrived or has been approved and has access to users currently listed in system 10. A System Administrator, for example, may be restricted from access to deal information within system 10, but may identify prospective users who are not in system 10. In another example of restriction of access, the CEO or a board member may not be able to access deal packages that are not yet completed and ready for review.

In an exemplary embodiment, system 10 (shown in FIG. 1) is configured to maintain and distribute an agenda using a template that is consistent to all of the business. System 10 receives and stores calendar information and is further configured to access a pitch from an agenda item.

In a specific embodiment, server 12 is configured to track all system users and facilitate interactive meetings and on-line chats. Interactive meetings are accomplished by receiving, storing, organizing and reporting of information to a user in real-time. In another specific embodiment, server 12 is configured to schedule and manage interactive meetings. System 10 facilitates interactive meetings by allowing questions and comments to be communicated among participants or users, in an on-line chat format, without interrupting meeting flow. In alternative embodiments, alternative servers (not shown) are connected to system 10 and are configured to facilitate the interactive meetings described above.

As described above, system 10, configured as an electronic boardroom, facilitates movement of information and reduces the time and travel associated with face to face meetings. In reviewing a business deal or other board review function, information is moved from one group or individual to another during the process of review, evaluation and approval thereby improving the process of evaluation and the quality of preparation. Referring back to the business deal example, businesses are able to automatically submit their deals while allowing a reviewing level, for example a corporate level reviewing level, to review and evaluate deals on an ad hoc basis.

While the invention has been described in terms of various specific embodiments, those skilled in the art will recognize that the invention can be practiced with modification within the spirit and scope of the claims.

What is claimed is:

1. A method for increasing efficiency of multi-level review of proposed business deals using an organizational management tool, the tool configured with a database of deals and a plurality of authorized reviewers for the deals, said method comprising the steps of:

a) creating a proposed deal by a user at a business unit included within a business entity including enabling a business unit to utilize a computer system to upload at least one business dashboard to the database, and populating the at least one business dashboard with information relating to the proposed deal, the proposed deal includes at least one of a detailed description of the proposed deal, a deal pitch, information supporting the proposed deal, and a cover letter, the proposed deal further includes a maximum approver associated with the business entity wherein the user selects the maximum approver based on at least one of approval limitations and deal type;

b) utilizing the computer system to transmit the proposed deal to a coordinator associated with the business entity;

c) enabling the coordinator to analyze the proposed deal including reviewing submitted documents for completeness, validating the information supporting the proposed deal, assigning a risk manager to the proposed deal, and selecting a list of reviewers for the proposed deal;

d) providing a calendar tool configured to schedule at least one meeting among the selected reviewers to discuss the proposed deal;

e) utilizing the computer system to transmit the proposed deal from the coordinator to the risk manager;

f) receiving a review summary from the risk manager including a recommendation as to whether to approve the proposed deal;

g) forwarding the proposed deal including the risk manager's recommendation to a next review level within the business entity;

h) analyzing the proposed deal including the risk manager's recommendation and appending a cover memo regarding the proposed deal; and i) repeating steps g) and h) until the next review level is the maximum approver wherein the maximum approver is then enabled to accept or decline the proposed deal.

2. A method according to claim 1 wherein said step of creating a proposed deal further comprises the step of notifying a coordinator of the proposed deal.

3. A method according to claim 1 wherein said step of utilizing the computer system to transmit the proposed deal from the coordinator to the risk manager further comprises the step of enabling the risk manager to recommend at least one of approve the proposed deal, approve the proposed deal with conditions, and decline the proposed deal.

4. A method according to claim 1 wherein said step of analyzing the proposed deal further comprises the step of adding at least one of comments and recommendations regarding the proposed deal.

5. A method according to claim 1 wherein said step of forwarding the proposed deal to a next review level further comprises the step of sending a notification including links to proposed deals for review to a reviewer.

6. A method according to claim 5 wherein said step of sending a notification including links to deals for review to a reviewer further comprises the step of sending a delinquency notice to a reviewer.

7. A method according to claim 1 further comprising the step of notifying a submitter of the proposed deal that the proposed deal has been reviewed each time a reviewer has completed a review.

8. A method according to claim 1 further comprising the step of notifying a submitter of the proposed deal of a resolution regarding the proposed deal.

9. A method according to claim 1 further comprising the step of storing a review status of a proposed deal.

10. A method according to claim 1 wherein said step of forwarding the proposed deal to a next review level further comprises the step of forwarding the proposed deal to authorized users based on stored role information which limit user capabilities.

11. A system for facilitating multi-level review of proposed business deals within a business entity, said system comprising:

at least one computer;

a server configured to store a database of proposed business deals, said server further configured to:

prompt a user to create a proposed deal including at least one of a detailed description of the proposed deal, a deal pitch, information supporting the proposed deal, and a cover letter, the proposed deal further includes a maximum approver associated with the business entity wherein the user selects the maximum approver based on at least one of approval limitations and deal type;

upload at least one business dashboard to the database, and populate the at least one business dashboard with information relating to the proposed deal;

transmit the proposed deal to a coordinator associated with the business entity;

prompt the coordinator to analyze the proposed deal, validate the information supporting the proposed deal, assign a risk manager to the proposed deal, and select a list of reviewers for the proposed deal;

transmit the proposed deal from the coordinator to the risk manager;

receive a review summary from the risk manager including a recommendation as to whether to approve the proposed deal;

transmit the proposed deal including the risk manager's recommendation to a next review level within the business entity; and prompt the next review level to analyze the proposed deal and, if the next review level is the maximum approver, enable the maximum approver to accept or decline the proposed deal;

a network connecting said at least one computer to said server; and a user interface including web pages configured to allow users and reviewers to input and receive information relating to the proposed deals.

12. A system according to claim 11 wherein said server is further configured to access a calendar tool configured to schedule at least one meeting among the selected reviewers to discuss the proposed deal.

13. A system according to claim 11 wherein said server is further configured to notify a coordinator that a proposed deal has been submitted.

14. A system according to claim 11 wherein said server is further configured to upload and store recommendations regarding the proposed deal.

15. A system according to claim 11 wherein said server is further configured to upload and store comments regarding the proposed deal.

16. A system according to claim 11 wherein said server is further configured to upload and store an appended cover memo for the proposed deal.

17. A system according to claim 11 wherein said server is further configured to notify a reviewer of proposed deals to be reviewed and further configured to include links to those proposed deals for review.

18. A system according to claim 11 wherein said server is further configured to notify a submitter of the proposed deal each time a reviewer has uploaded a review.

19. A system according to claim 11 wherein said server is further configured to notify a submitter of the proposed deal when a resolution regarding the proposed deal has been uploaded.

20. A system according to claim 11 wherein said server is further configured to store a review status of a proposed deal.

21. A system according to claim 11 wherein said server is further configured to send a delinquency notice to a reviewer.

22. A system according to claim 11 wherein said server is further configured to limit user capabilities based on stored role information.

* * * * *